(12) United States Patent
Kurosu

(10) Patent No.: US 12,717,124 B2
(45) Date of Patent: Aug. 25, 2026

(54) ZOOM LENS AND IMAGE PICKUP APPARATUS

(71) Applicant: CANON KABUSHIKI KAISHA, Tokyo (JP)

(72) Inventor: Yusuke Kurosu, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 278 days.

(21) Appl. No.: 18/440,035

(22) Filed: Feb. 13, 2024

(65) Prior Publication Data

US 2024/0310611 A1 Sep. 19, 2024

(30) Foreign Application Priority Data

Mar. 15, 2023 (JP) ................................ 2023-040341

(51) Int. Cl.
*G02B 15/14* (2006.01)
*G02B 13/18* (2006.01)

(52) U.S. Cl.
CPC ......... *G02B 15/1461* (2019.08); *G02B 13/18* (2013.01)

(58) Field of Classification Search
None
See application file for complete search history.

(56) References Cited

U.S. PATENT DOCUMENTS 12,517,333 B2 * 1/2026 Nakahara ............. G02B 13/009
2022/0244488 A1 * 8/2022 Sakamoto ...... G02B 15/144109

FOREIGN PATENT DOCUMENTS

JP 2011-107693 A 6/2011

* cited by examiner

*Primary Examiner* — Richard H Kim
(74) *Attorney, Agent, or Firm* — Carter, DeLuca & Farrell LLP

(57) ABSTRACT

A zoom lens includes, as a plurality of lens units arranged in order from an object side to an image side, a first lens unit having positive refractive power and fixed for zooming, at least two movable lens units having negative refractive powers and configured to move for zooming, and a final lens unit having positive refractive power, fixed for zooming, and disposed closest to an image plane. A distance between adjacent lens units changes during zooming. At least a part of the first lens unit moves for focusing. The first lens unit includes one negative lens and at least five positive lenses, which are successively arranged in this order from the object side to the image side. Predetermined inequalities are satisfied.

13 Claims, 13 Drawing Sheets

ZOOM LENS AND IMAGE PICKUP APPARATUS

BACKGROUND

Technical Field

One of the aspects of the embodiments relates to a zoom lens for use with an image pickup apparatus.

Description of Related Art

Among zoom lenses, a positive lead type zoom lens has a lens unit having positive refractive power and disposed closest to an object, and performs focusing by moving a part of this positive lens unit. As such a zoom lens, Japanese Patent Laid-Open No. 2011-107693 discloses a zoom lens that includes, in order from the object side to the image side, a first lens unit having positive refractive power and fixed for zooming, a second lens unit having a negative refractive power and movable for zooming, and a final lens unit that does not move for zooming.

In order to achieve a wide angle of view, a small size, a high zoom ratio, and high optical performance over the entire zoom range in a positive lead zoom lens, the first lens unit that has a focusing function is properly configured. In the zoom lens disclosed in Japanese Patent Laid-Open No. 2011-107693, as the angle of view at the wide-angle end increases, distortion may occur or the diameter of the first lens unit may become larger.

SUMMARY

A zoom lens according to one aspect of the embodiment includes, as a plurality of lens units arranged in order from an object side to an image side, a first lens unit having positive refractive power and fixed for zooming, at least two movable lens units having negative refractive powers and configured to move for zooming, and a final lens unit having positive refractive power, fixed for zooming, and disposed closest to an image plane. A distance between adjacent lens units changes during zooming. At least a part of the first lens unit moves for focusing. The first lens unit includes one negative lens and at least five positive lenses, which are successively arranged in this order from the object side to the image side. The following inequalities are satisfied:

$$2.96 \leq Ndn + 0.0333 \times vdn \leq 3.20$$

$$1.82 \leq Ndn \leq 2.07$$

$$2.0 \leq |fln / fw| \leq 18.0$$

where Ndn is a refractive index of the negative lens for d-line, vdn is an Abbe number of the negative lens based on the d-line, fln is a focal length of the negative lens, and fw is a focal length of the zoom lens at a wide-angle end. An image pickup apparatus having the above zoom lens also constitutes another aspect of the embodiment.

Further features of various embodiments of the disclosure will become apparent from the following description of embodiments with reference to the attached drawings.

DESCRIPTION OF THE EMBODIMENTS

Figure 1:
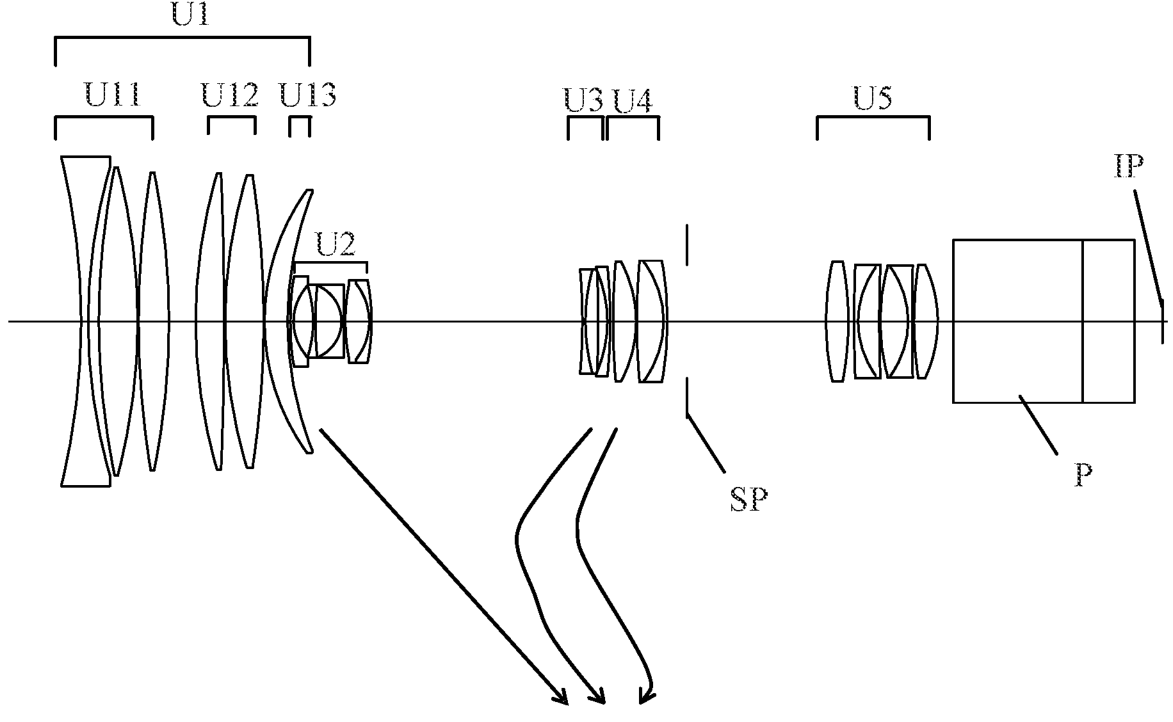
FIG. 1 illustrates a sectional view of a zoom lens according to Example 1 in an in-focus state at infinity at a wide-angle end.

Referring now to the accompanying drawings, a description will be given of embodiments according to the disclosure. FIGS. 1, 3, 5, 7, 9, and 11 illustrate the optical configurations of zoom lenses according to Examples 1, 2, 3, 4, 5, and 6 in in-focus states at infinity, respectively. In each figure, a left side is an object side, and a right side is an image side.

In a zoom lens, a lens unit is a group of one or more lenses that move together during zooming between a wide-angle end and a telephoto end. That is, a distance between adjacent lens units changes during zooming. The lens unit may include an aperture stop. The wide-angle end and telephoto end are zoom states at the maximum angle of view (shortest focal length) and the minimum angle of view (maximum focal length), respectively, in a case where the lens unit that moves during zooming is located at both ends of the mechanically or controllably movable range on the optical axis.

Prior to a detailed description of each example, matters common to each example will be described. The zoom lens according to each example is used as an optical system of various image pickup apparatuses such as a broadcasting camera, a cinema camera, a video camera, a surveillance camera, a digital still camera, and a film-based camera.

The zoom lens according to each example includes, as a plurality of lens units in order from the object side to the image side, a first lens unit having positive refractive power and fixed for zooming, at least two movable lens units having negative refractive powers and configured to move for zooming, and a final lens unit having positive refractive power, fixed for zooming, and disposed closest to an image plane. The final lens unit fixed for zooming can reduce the size of the zoom lens by suppressing an increase in the overall lens length.

In the zoom lens according to each example, at least a part of the first lens unit moves for focusing. The first lens unit includes one negative lens and at least five positive lenses, which are successively arranged in this order from the object side to the image side.

The following inequalities (1) to (3) are satisfied:

$$2.96 \leq Ndn + 0.0333 \times vdn \leq 3.20 \quad (1)$$

$$1.82 \leq Ndn \leq 2.07 \quad (2)$$

$$2.0 \leq |f1n/fw| \leq 18.0 \quad (3)$$

where Ndn is a refractive index of the negative lens for the d-line, vdn is an Abbe number of the negative lens based on the d-line, fln is a focal length of the negative lens, and fw is a focal length of the zoom lens at the wide-angle end.

Inequalities (1) to (3) define the characteristics of the negative lens closest to the object in the first lens unit in the zoom lens having the above configuration. The negative lens satisfying inequalities (1) to (3) is beneficial to the zoom lens having a wide angle of view, a small size, a high zoom ratio, and high optical performance over the entire zoom range. In a case where Ndn+0.0333×vdn becomes lower than the lower limit of inequality (1), the Abbe number of the negative lens becomes too small and the difference in Abbe number from the positive lens becomes too large, and it becomes difficult to correct first-order longitudinal chromatic aberration at the telephoto end. In a case where Ndn+0.0333×vdn becomes higher than the upper limit of inequality (1), the Abbe number of the negative lens becomes too large and the difference in Abbe number from the positive lens becomes too small, and it becomes difficult to correct longitudinal chromatic aberration at the telephoto end.

Inequality (1) may be replaced with inequality (1a) below:

$$2.96 \leq Ndn + 0.033 \times vdn \leq 3.16 \quad (1a)$$

Inequality (1) may be replaced with inequality (1b) below:

$$2.97 \leq Ndn + 0.0333 \times vdn \leq 3.13 \quad (1b)$$

In a case where Ndn becomes lower than the lower limit of inequality (2), the refractive index of the negative lens becomes too small, and it becomes difficult to correct various aberrations, especially distortion, at the wide-angle end. In a case where Ndn becomes higher than the upper limit of inequality (2), it becomes difficult to correct longitudinal chromatic aberration at the telephoto end.

Inequality (2) may be replaced with inequality (2a) below:

$$1.82 \leq Ndn \leq 2.00 \quad (2a)$$

Inequality (2) may be replaced with inequality (2b) below:

$$1.83 \leq Ndn \leq 1.97 \quad (2b)$$

In a case where |fln/fw| becomes lower than the lower limit of inequality (3), the absolute value of the focal length of the negative lens becomes too small, and it becomes difficult to correct various aberrations, especially distortion, at the wide-angle end. In a case where |fln/fw| becomes higher than the upper limit of inequality (3), the absolute value of the focal length of the negative lens becomes too large, it becomes difficult to secure a wide angle of view at the wide-angle end.

Inequality (3) may be replaced with inequality (3a) below:

$$4.0 \leq |fln/fw| \leq 13.0 \quad (3a)$$

Inequality (3) may be replaced with inequality (3b) below:

$$4.5 \leq |fln/fw| \leq 12.6 \quad (3b)$$

The zoom lens according to each example satisfies at least one of the following inequalities (4) to (8).

The following inequality (4) may be satisfied:

$$-0.3 \leq (R2 + R1)/(R2 - R1) \leq 0.3 \quad (4)$$

where R1 is a radius of curvature of a lens surface on the object side of the negative lens in the first lens unit, and R2 is a radius of curvature of a lens surface on the image side of the negative lens in the first lens unit.

Inequality (4) defines the shape (shape factor) of the negative lens. In a case where the shape factor of the negative lens becomes lower than the lower limit of inequality (4), it becomes difficult to correct various aberrations, especially spherical aberration, at the telephoto end. In a case where the shape factor of the negative lens becomes higher than the upper limit of inequality (4), it becomes difficult to secure a wide angle of view at the wide-angle end.

Inequality (4) may be replaced with inequality (4a) below:

$$-0.290 \leq (R2 + R1)/(R2 - R1) \leq 0.295 \quad (4a)$$

Inequality (4) may be replaced with inequality (4b) below:

$$-0.28 \leq (R2 + R1)/(R2 - R1) \leq 0.29 \quad (4b)$$

The following inequality (5) may be satisfied:

$$4.4 \leq Dn \leq 6.0 \quad (5)$$

where Dn is the specific gravity (of the optical material) of the negative lens in the first lens unit.

Inequality (5) defines the specific gravity of the optical material for the negative lens. In a case where Dn becomes lower than the lower limit of inequality (5), it becomes difficult to select a material with a high refractive index as the material for the negative lens, and as a result, it becomes difficult to secure a wide angle of view at the wide-angle end. In a case where Dn becomes higher than the upper limit of inequality (5), the negative lens that has a high volume in the first lens unit becomes too heavy.

Inequality (5) may be replaced with inequality (5a) below:

$$4.4 \leq Dn \leq 5.6 \tag{5a}$$

Inequality (5) may be replaced with inequality (5b) below:

$$4.4 \leq Dn \leq 5.2 \tag{5b}$$

The following inequality (6) may be satisfied:

$$80.0 \leq vdpave \leq 96.0 \tag{6}$$

where vdpave is an average Abbe number of the five positive lenses in the first lens unit (of the optical material) based on the d-line.

Inequality (6) defines the Abbe numbers of the optical materials for the five positive lenses in the first lens unit. In a case where vdpave becomes lower than the lower limit of inequality (6), the difference in Abbe numbers between the negative and positive lenses in the first lens unit becomes too small, and it becomes difficult to correct longitudinal chromatic aberration at the telephoto end. In a case where vdpave becomes higher than the upper limit of inequality (6), the absolute value of the focal length of the positive lens becomes too large and the length of the first lens unit on the optical axis increases.

Inequality (6) may be replaced with inequality (6a) below:

$$82.0 \leq vdpave \leq 90.0 \tag{6a}$$

Inequality (6) may be replaced with inequality (6b) below:

$$84.0 \leq vdpave \leq 88.0 \tag{6b}$$

The following inequality (7) may be satisfied:

$$2.8 \leq |fl/fnmx| \leq 13.0 \tag{7}$$

where fl is a focal length of the first lens unit, and fnmx is a focal length of the lens unit with the maximum absolute value of refractive power among at least two movable lens units having negative refractive power.

Inequality (7) defines a relationship between the focal length of the first lens unit and the focal length of the lens unit with the largest absolute value of refractive power among the movable lens units. In a case where |fl/fnmx| becomes lower than the lower limit of inequality (7), the refractive power of the negative movable lens unit, which has the largest absolute value of refractive power, becomes too weak relative to the refractive power of the positive first lens unit, and a moving amount of the negative movable lens unit during zooming becomes too large and the overall lens length of the zoom lens increases. In a case where |fl/fnmx| becomes higher than the upper limit of inequality (7), the refractive power of the negative movable lens unit becomes too strong relative to the refractive power of the positive first lens unit, and aberrational fluctuations during zooming become significant.

Inequality (7) may be replaced with inequality (7a) below:

$$3.0 \leq |fl/fnmx| \leq 10.0 \tag{7a}$$

Inequality (7) may be replaced with inequality (7b) below:

$$3.8 \leq |fl/fnmx| \leq 8.0 \tag{7b}$$

The following inequality (8) may be satisfied:

$$0.5 \leq |fln/fl| \leq 5.0 \tag{8}$$

where fl is the focal length of the first lens unit, and fln is the focal length of the negative lens in the first lens unit.

Inequality (8) defines a relationship between the focal length of the first lens unit and the focal length of the negative lens in the first lens unit. In a case where fln/fl| becomes lower than the lower limit of inequality (8), the absolute value of the refractive power of the negative lens becomes too strong relative to the absolute value of the refractive power of the first lens unit, and aberrational fluctuations during zooming become significant. In a case where |fln/fl| becomes higher than the upper limit of inequality (8), the absolute value of the refractive power of the negative lens becomes too weak relative to the absolute value of the refractive power of the first lens unit, the diameter of the negative lens becomes large, and the size reduction cannot be achieved.

Inequality (8) may be replaced with inequality (8a) below:

$$0.8 \leq |fln/fl| \leq 3.5 \tag{8a}$$

Inequality (8) may be replaced with inequality (8b) below:

$$1.0 \leq |fln/fl| \leq 2.0 \tag{8b}$$

The zoom lens according to each example may have at least one of the following configurations.

The first lens unit may include a first subunit, a second subunit, and a third subunit, which are in order from the object side to the image side, and the second subunit may have positive refractive power and move toward the object side for focusing from infinity to a close distance. Thereby, a moving amount of the second subunit for focusing and aberrational fluctuations due to movement of the second subunit can be reduced, which is beneficial to high performance.

The first lens unit may consist of one negative lens and five positive lenses, which are arranged in order from the object side to the image side. This configuration can achieve a wide angle of view at the wide-angle end and a high zoom ratio while suppressing an increase in the overall lens length.

The zoom lens according to each example may include, in order from the object side to the image side, the first lens unit, a second lens unit having negative refractive power and configured to move for zooming, and a rear group. The rear groups may include the final lens unit, a lens unit having positive refractive power and configured to move for zooming, and at least one lens unit configured to move for zooming, which are successively arranged in this order from the image side to the object side.

A specific description will now be given of the zoom lenses according to Examples 1 to 6.

Example 1

The zoom lens according to Example 1 illustrated in FIG. 1 includes, in order from the object side to the image side, a first lens unit U1 having positive refractive power, a second lens unit U2 having negative refractive power, a third lens unit U3 having negative refractive power, a fourth lens unit U4 having positive refractive power, an aperture stop SP, and a fifth (final) lens unit U5 having positive refractive power. Below each lens unit that moves for zooming in FIG. 1, a moving locus of the lens unit during zooming from the wide-angle end to the telephoto end is illustrated. This also applies to the diagrams of the zoom lenses according to other embodiments to be described below.

The first lens unit U1 is fixed for zooming. The first lens unit U1 consists of a total of six lenses, one negative lens and five positive lenses, which are successively arranged in this order from the object side to the image side. The first lens unit U1 includes, in order from the object side to the image side, a first subunit U11 having negative refractive power, a second subunit U12 having positive refractive power, and a third subunit U13 having positive refractive power. The second subunit U12 moves toward the object side for focusing from infinity to a close distance. The third subunit U13 moves toward the object for focusing from infinity to a close distance, independently of the second subunit U12. Thus, a distance between adjacent subunits changes during focusing.

The second lens unit U2 is a variator that moves toward the image side during zooming from the wide-angle end to the telephoto end. During zooming from the wide-angle end to the telephoto end, the third lens unit U3 first moves toward the object side and then moves toward the image side. During zooming from the wide-angle end to the telephoto end, the fourth lens unit U4 first moves to the object side, then moves to the image side, and then moves to the object side. The fifth lens unit U5 is fixed for zooming. An extender lens for focal length conversion or the like may be installed in the fifth lens unit U5.

In FIG. 1, P represents a glass block that includes an optical filter such as a color separation prism and an ND filter. IP represents an image plane. An imaging surface of an image sensor such as a CCD sensor or a CMOS sensor and a film surface (photosensitive surface) of a silver halide film are disposed on the image plane IP. The glass block P and image plane IP are similarly illustrated in the figures of other embodiments described below.

Numerical example 1 corresponding to Example 1 will be illustrated after Example 6, which will be described below. In numerical example 1, a surface number i indicates the order of the surface counted from the object side. r represents a radius of curvature of an i-th surface from the object side (mm), d represents a lens thickness or air gap (mm) between i-th and (i+1)-th surfaces, and nd represents a refractive index between the i-th and (i+1)-th surfaces for the d-line of the optical material. νdi is an Abbe number based on the d-line of the optical material between the i-th and (i+1)-th surfaces.

An Abbe number of a certain material is represented as follows:

$$\nu d=(Nd-1)/(NF-NC)$$

where Nd, NF, and NC are refractive indexes of the d-line (587.6 nm), F-line (486.1 nm), and C-line (656.3 nm) in the Fraunhofer line.

A focal length (mm), an F-number, and a half angle of view (°) are all values in a case where the zoom lens is in an in-focus state on an infinity object. BF represents back focus. The "back focus" is a distance on the optical axis from the final lens surface (the lens surface closest to the image plane) of the zoom lens to the paraxial image plane expressed in terms of air equivalent length. An overall lens length is a length obtained by adding the back focus to the distance on the optical axis from the foremost lens surface (lens surface closest to the object) to the final lens surface.

An asterisk "*" attached to a surface number means that the surface has an aspherical shape. The aspherical shape is expressed as follows:

$$X=\frac{H^2/R}{1+\sqrt{1-(1+k)(H/R)^2}}+A4\cdot H^4+A6\cdot H^6+A8\cdot H^8+A10\cdot H^{10}+A12\cdot H^{12}+A14\cdot H^{14}+A16\cdot H^{16}$$

where X is a displacement amount from the surface vertex in the optical axis direction, H is a height from the optical axis in the direction perpendicular to the optical axis, R is a paraxial radius of curvature, K is a conical constant, and A3 to A16 are aspherical coefficients of each order. "e-Z" in each conical constant and aspherical coefficient means "$\times10^{-Z}$." WIDE means a wide-angle end, MIDDLE means an intermediate zoom position, and TELE means a telephoto end.

Table 1 summarizes values of inequalities (1) to (8) in numerical example 1. Numerical example 1 satisfies inequalities (1) to (8). Thereby, the zoom lens according to Example 1 (numerical example 1) has a small size, a wide angle of view, a high zoom ratio, and high optical performance over the entire zoom range.

Figures 2A, 2B:
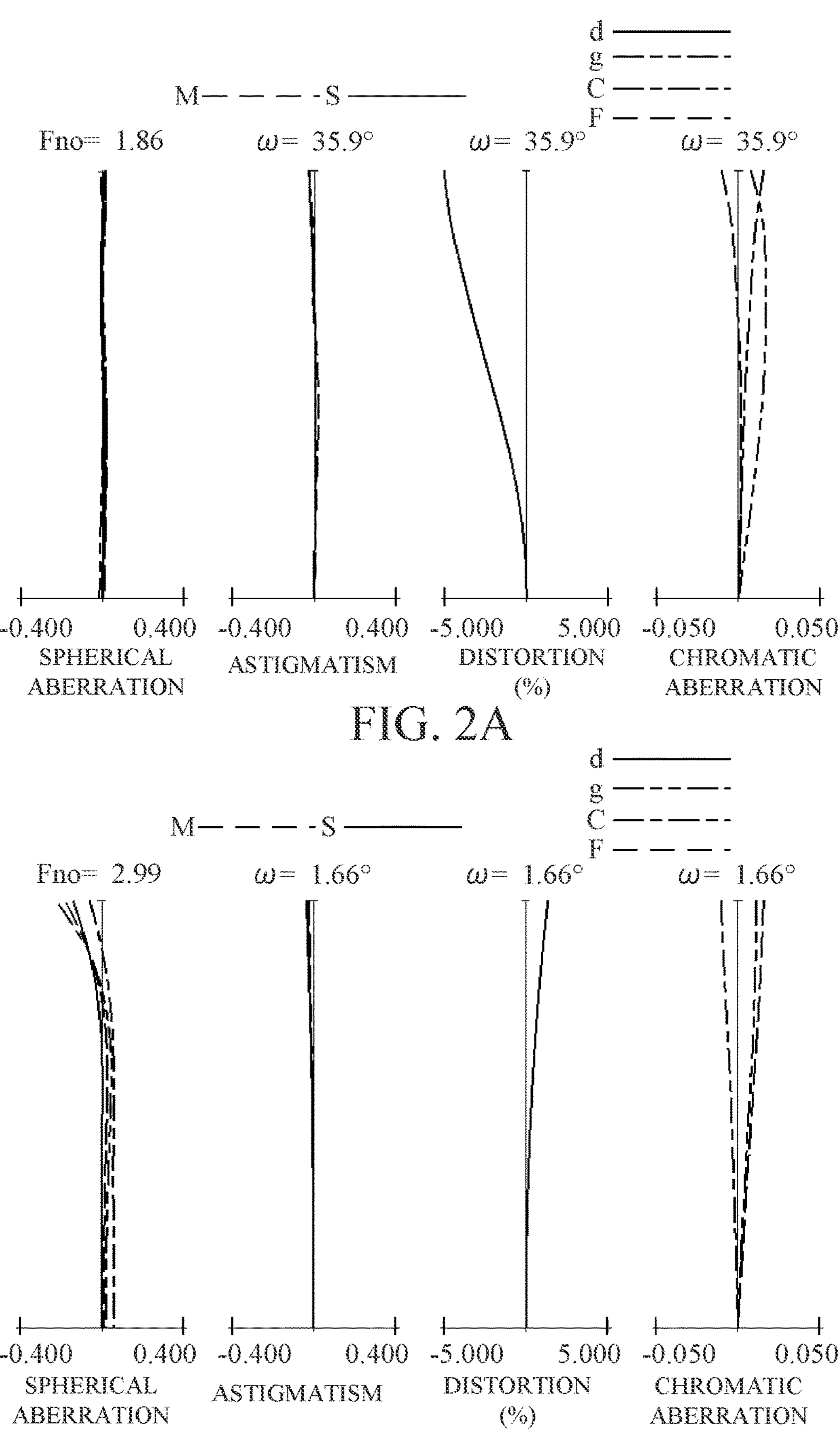
FIGS. 2A and 2B are aberration diagrams of the zoom lens according to Example 1 in the in-focus state at infinity at the wide-angle end and a telephoto end.

FIG. 2A illustrates longitudinal aberrations (spherical aberration, astigmatism, distortion, and chromatic aberration) of the zoom lens according to numerical example 1 in the in-focus state at infinity at the wide-angle end. FIG. 2B illustrates longitudinal aberrations of the zoom lens according to numerical example 1 in the in-focus state at infinity at the telephoto end.

In the spherical aberration diagram, Fno represents an F-number, and a straight line, an alternate long and two short dashes line, an alternate long and short dash line, and a broken line indicate spherical aberration amounts for the d-line, g-line (wavelength 435.8 nm), C-line, and F-line, respectively. The astigmatism diagram indicates astigmatism amounts, a solid line S represents a sagittal image plane, and a broken line M represents a meridional image plane. The distortion aberration indicates a distortion amount for the d-line by an alternate long and two short dashes line. In the chromatic aberration diagram, an alternate long and two short dashes line, an alternate long and short dash line, and a broken line indicate lateral chromatic aberration amounts for the g-line, C-line, and F-line, respectively. ω is a half angle of view (°).

A description of the above numerical examples and aberration diagrams is similarly applied to other numerical examples described below.

Example 2

Figure 3:
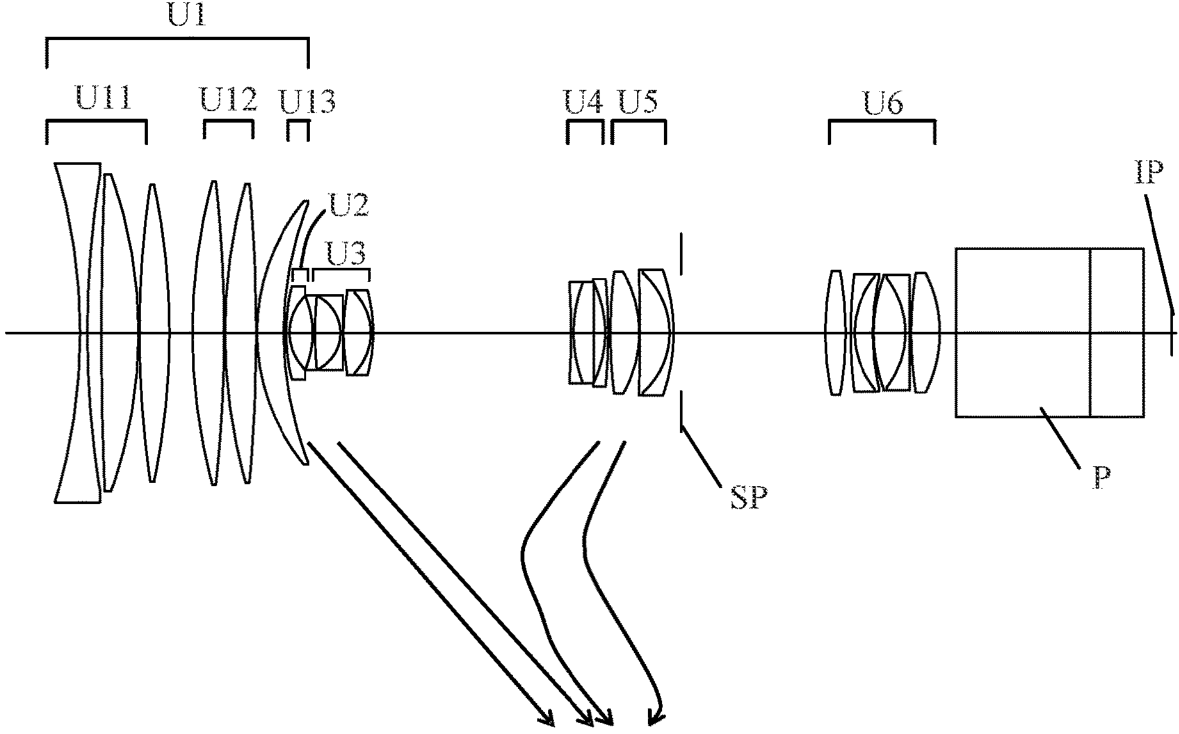
FIG. 3 is a sectional view of a zoom lens according to Example 2 in an in-focus state at infinity at the wide-angle end.

The zoom lens according to Example 2 illustrated in FIG. 3 includes, in order from the object side to the image side, a first lens unit U1 having positive refractive power, a second lens unit U2 having negative refractive power, a third lens unit U3 having negative refractive power, a fourth lens unit U4 having negative refractive power, a fifth lens unit U5 having positive refractive power, an aperture stop SP, and a sixth (final) lens unit U6 having positive refractive power.

The first lens unit U1 is fixed for zooming. The first lens unit U1 consists of a total of six lenses, one negative lens and five positive lenses, which are successively arranged in this order from the object side to the image side. The first lens unit U1 includes, in order from the object side to the image side, a first subunit U11 having negative refractive power, a second subunit U12 having positive refractive power, and a third subunit U13 having positive refractive power. The second subunit U12 moves toward the object side for focusing from infinity to a close distance. The third subunit U13 moves toward the object for focusing from infinity to a close distance, independently of the second subunit U12.

The second lens unit U2 is a variator that moves toward the image side during zooming from the wide-angle end to the telephoto end. The third lens unit U3 moves toward the image side during zooming from the wide-angle end to the telephoto end. During zooming from the wide-angle end to the telephoto end, the fourth lens unit U4 first moves toward the object side and then moves toward the image side. During zooming from the wide-angle end to the telephoto end, the fifth lens unit U5 first moves to the object side, then moves to the image side, and then moves to the object side. The sixth lens unit U6 is fixed for zooming. An extender lens or the like may be installed in the sixth lens unit U6.

Numerical example 2 corresponding to Example 2 will be illustrated after Example 6, which will be described below. Table 1 summarizes values of inequalities (1) to (8) in numerical example 2. Numerical example 2 satisfies inequalities (1) to (8). Thereby, the zoom lens according to Example 2 (numerical example 2) has a small size, a wide angle of view, a high zoom ratio, and high optical performance over the entire zoom range.

Figures 4A, 4B:
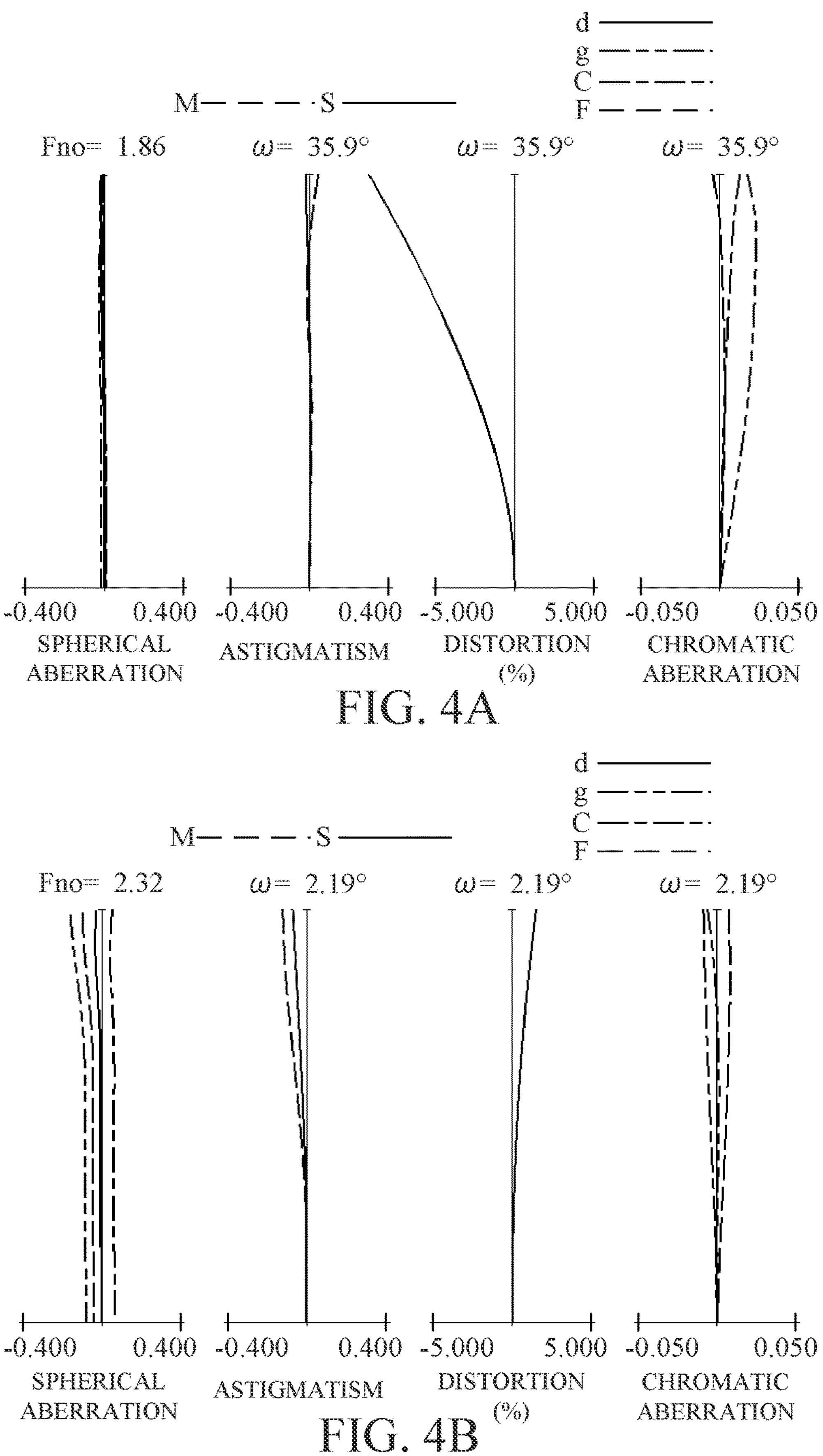
FIGS. 4A and 4B are aberration diagrams of the zoom lens according to Example 2 in the in-focus state at infinity at the wide-angle end and a telephoto end.

FIG. 4A illustrates longitudinal aberrations of the zoom lens according to numerical example 2 in the in-focus state at infinity at the wide-angle end. FIG. 4B illustrates longitudinal aberrations of the zoom lens according to numerical example 2 in the in-focus state at infinity at the telephoto end.

Example 3

Figure 5:
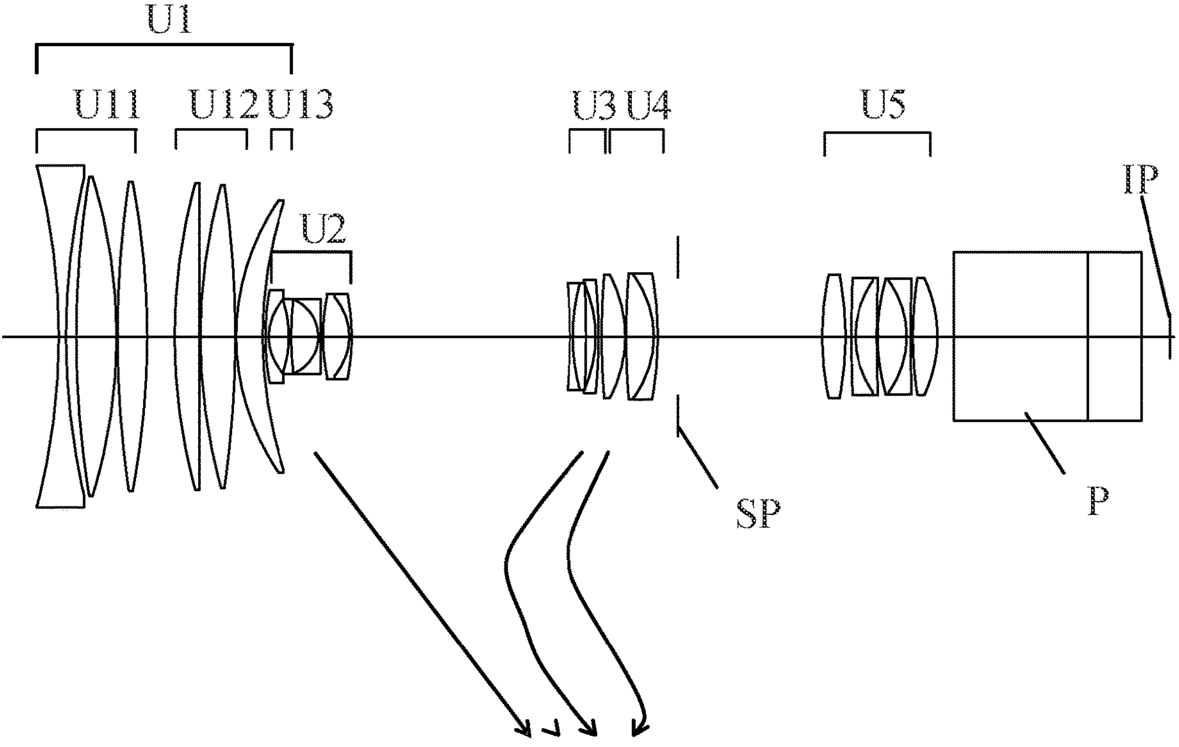
FIG. 5 is a sectional view of a zoom lens according to Example 3 in an in-focus state at infinity at a wide-angle end.

The zoom lens according to Example 3 illustrated in FIG. 5 includes, in order from the object side to the image side, a first lens unit U1 having positive refractive power, a second lens unit U2 having negative refractive power, a third lens unit U3 having negative refractive power, a fourth lens unit U4 having positive refractive power, an aperture stop SP, and a fifth (final) lens unit U5 having positive refractive power.

The first lens unit U1 is fixed for zooming. The first lens unit U1 consists of a total of six lenses, one negative lens and five positive lenses, which are successively arranged in this order from the object side to the image side. The first lens unit U1 includes, in order from the object side to the image side, a first subunit U11 having negative refractive power, a second subunit U12 having positive refractive power, and a third subunit U13 having positive refractive power. The second subunit U12 moves toward the object side for focusing from infinity to a close distance. The third subunit U13 moves toward the object side for focusing from infinity to a close distance, independently of the second subunit U12.

The second lens unit U2 is a variator that moves toward the image side during zooming from the wide-angle end to the telephoto end. During zooming from the wide-angle end to the telephoto end, the third lens unit U3 first moves toward the object side and then moves toward the image side. During zooming from the wide-angle end to the telephoto end, the fourth lens unit U4 first moves to the object side, then moves to the image side, and then moves to the object side. The fifth lens unit U5 is fixed for zooming. An extender lens or the like may be installed in the fifth lens unit U5.

Numerical example 3 corresponding to Example 3 will be illustrated after Example 6, which will be described below. Table 1 summarizes values of inequalities (1) to (8) in numerical example 3. Numerical example 3 satisfies inequalities (1) to (8). Thereby, the zoom lens according to Example 3 (numerical example 3) has a small size, a wide angle of view, a high zoom ratio, and high optical performance over the entire zoom range.

Figures 6A, 6B:
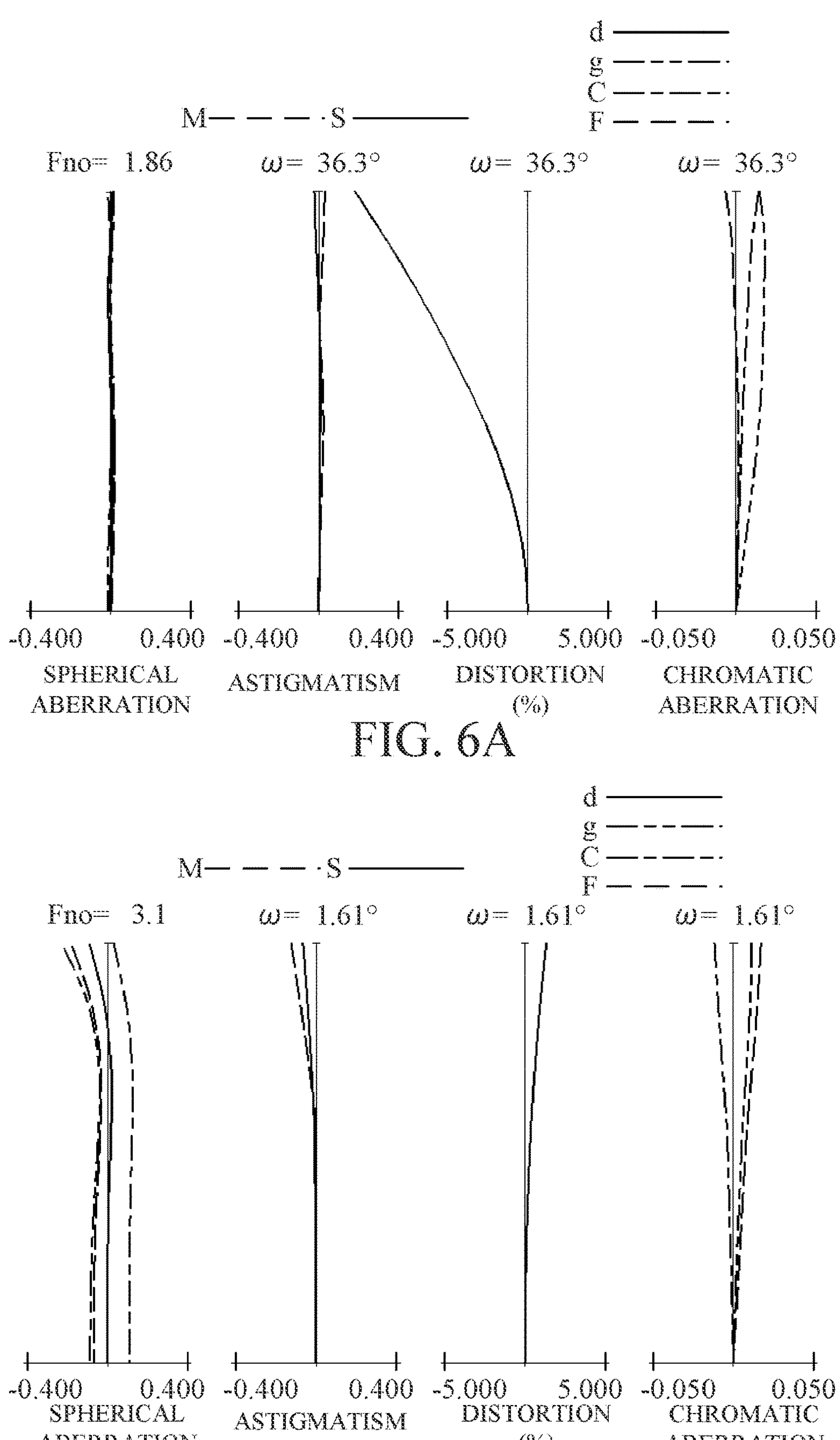
FIGS. 6A and 6B are aberration diagrams of the zoom lens according to Example 3 in the in-focus state at infinity at the wide-angle end and a telephoto end.

FIG. 6A illustrates longitudinal aberrations of the zoom lens according to numerical example 3 in the in-focus state at infinity at the wide-angle end. FIG. 6B illustrates longitudinal aberrations of the zoom lens according to numerical example 3 in the in-focus state at infinity at the telephoto end.

Example 4

Figure 7:
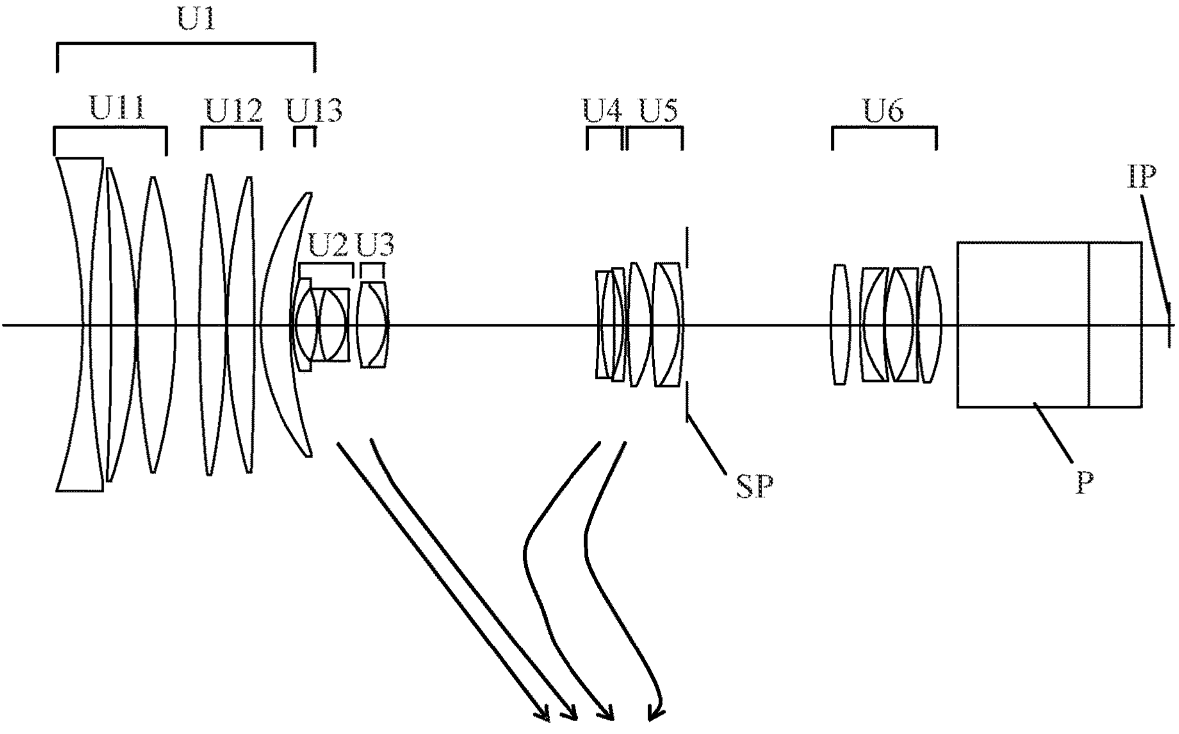
FIG. 7 is a sectional view of a zoom lens according to Example 4 in an in-focus state at infinity at a wide-angle end.

The zoom lens according to Example 4 illustrated in FIG. 7 includes, in order from the object side to the image side, a first lens unit U1 having positive refractive power, a second lens unit U2 having negative refractive power, a third lens unit U3 having positive refractive power, a fourth lens unit U4 having negative refractive power, a fifth lens unit U5 having positive refractive power, an aperture stop SP, and a sixth (final) lens unit U6 having positive refractive power.

The first lens unit U1 is fixed for zooming. The first lens unit U1 consists of a total of six lenses, one negative lens and five positive lenses, which are successively arranged in this order from the object side to the image side. The first lens unit U1 includes, in order from the object side to the image side, a first subunit U11 having negative refractive power, a second subunit U12 having positive refractive power, and a third subunit U13 having positive refractive power. The second subunit U12 moves toward the object side for focusing from infinity to a close distance. The third subunit U13 moves toward the object side for focusing from infinity to a close distance, independently of the second subunit U12.

The second lens unit U2 is a variator that moves toward the image side during zooming from the wide-angle end to the telephoto end. The third lens unit U3 moves toward the image side during zooming from the wide-angle end to the telephoto end. During zooming from the wide-angle end to the telephoto end, the fourth lens unit U4 first moves toward the object side and then moves toward the image side. During zooming from the wide-angle end to the telephoto end, the fifth lens unit U5 first moves to the object side, then moves to the image side, and then moves to the object side. The sixth lens unit U6 is fixed for zooming. An extender lens or the like may be installed in the sixth lens unit U6.

Numerical example 4 corresponding to Example 4 will be illustrated after Example 6, which will be described below. Table 1 summarizes values of the inequalities (1) to (8) in numerical example 4. Numerical example 4 satisfies inequalities (1) to (8). Thereby, the zoom lens according to Example 4 (numerical example 4) has a small size, a wide angle of view, a high zoom ratio, and high optical performance over the entire zoom range.

Figures 8A, 8B:
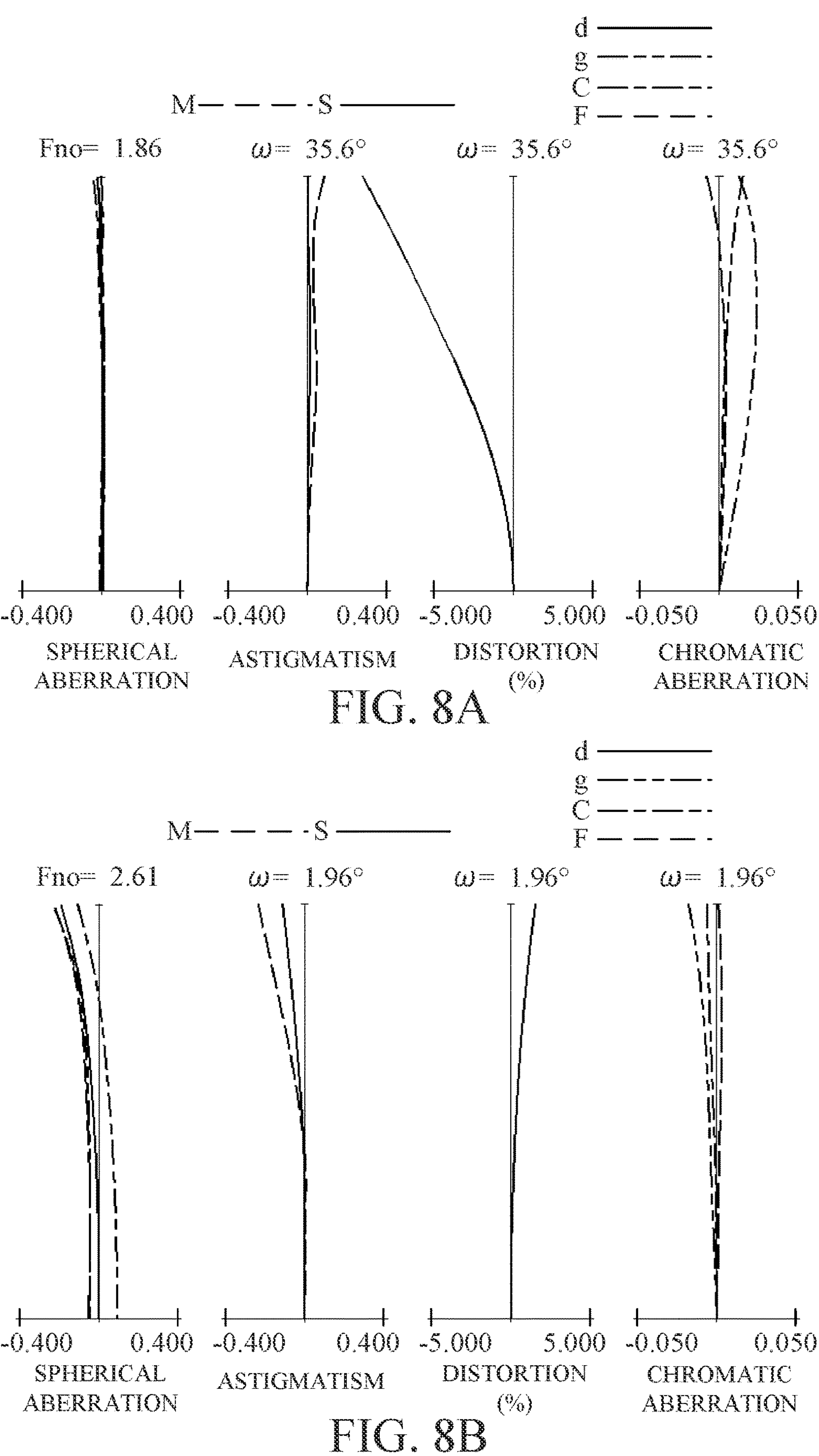
FIGS. 8A and 8B are aberration diagrams of the zoom lens according to Example 4 in the in-focus state at infinity at the wide-angle end and a telephoto end.

FIG. 8A illustrates longitudinal aberrations of the zoom lens according to numerical example 4 in the in-focus state at infinity at the wide-angle end. FIG. 8B illustrates longitudinal aberrations of the zoom lens according to numerical example 4 in the in-focus state at infinity at the telephoto end.

Example 5

Figure 9:
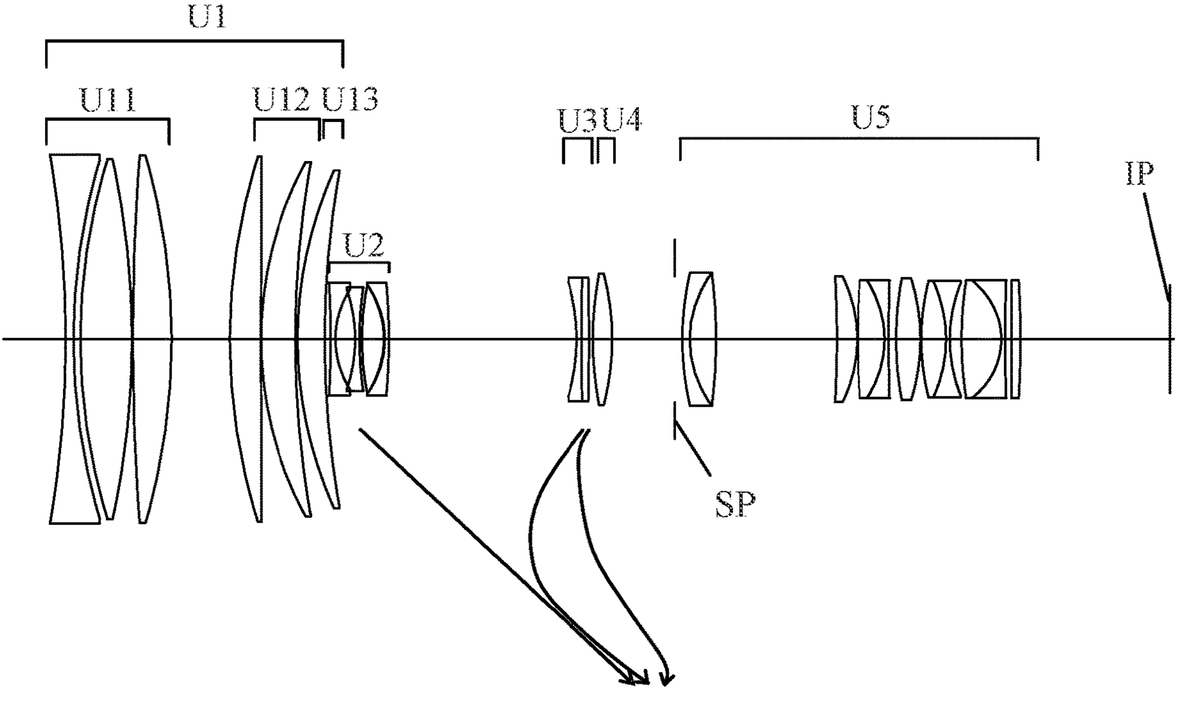
FIG. 9 is a sectional view of a zoom lens according to Example 5 in an in-focus state at infinity at the wide-angle end.

The zoom lens according to Example 5 illustrated in FIG. 9 includes, in order from the object side to the image side, a first lens unit U1 having positive refractive power, a second lens unit U2 having negative refractive power, a third lens unit U3 having negative refractive power, a fourth lens unit U4 having positive refractive power, an aperture stop SP, and a fifth (final) lens unit U5 having positive refractive power.

The first lens unit U1 is fixed for zooming. The first lens unit U1 includes a total of six lenses, one negative lens and five positive lenses, which are successively arranged in this order from the object side to the image side. The first lens unit U1 includes, in order from the object side to the image side, a first subunit U11 having negative refractive power, a second subunit U12 having positive refractive power, and a third subunit U13 having positive refractive power. The second subunit U12 moves toward the object side for focusing from infinity to a close distance. The third subunit U13 moves toward the object side for focusing from infinity to a close distance, independently of the second subunit U12.

The second lens unit U2 is a variator that moves toward the image side during zooming from the wide-angle end to the telephoto end. During zooming from the wide-angle end to the telephoto end, the third lens unit U3 first moves toward the object side and then moves toward the image side. During zooming from the wide-angle end to the telephoto end, the fourth lens unit U4 first moves to the object side, then moves to the image side, and then moves to the object side. The fifth lens unit U5 is fixed for zooming. An extender lens or the like may be installed in the fifth lens unit U5.

Numerical example 5 corresponding to Example 5 will be illustrated after Example 6, which will be described below. Table 1 summarizes values of inequalities (1) to (8) in numerical example 5. Numerical example 5 satisfies inequalities (1) to (8). Thereby, the zoom lens according to Example 5 (numerical example 5) has a small size, a wide angle of view, a high zoom ratio, and high optical performance over the entire zoom range.

Figures 10A, 10B:
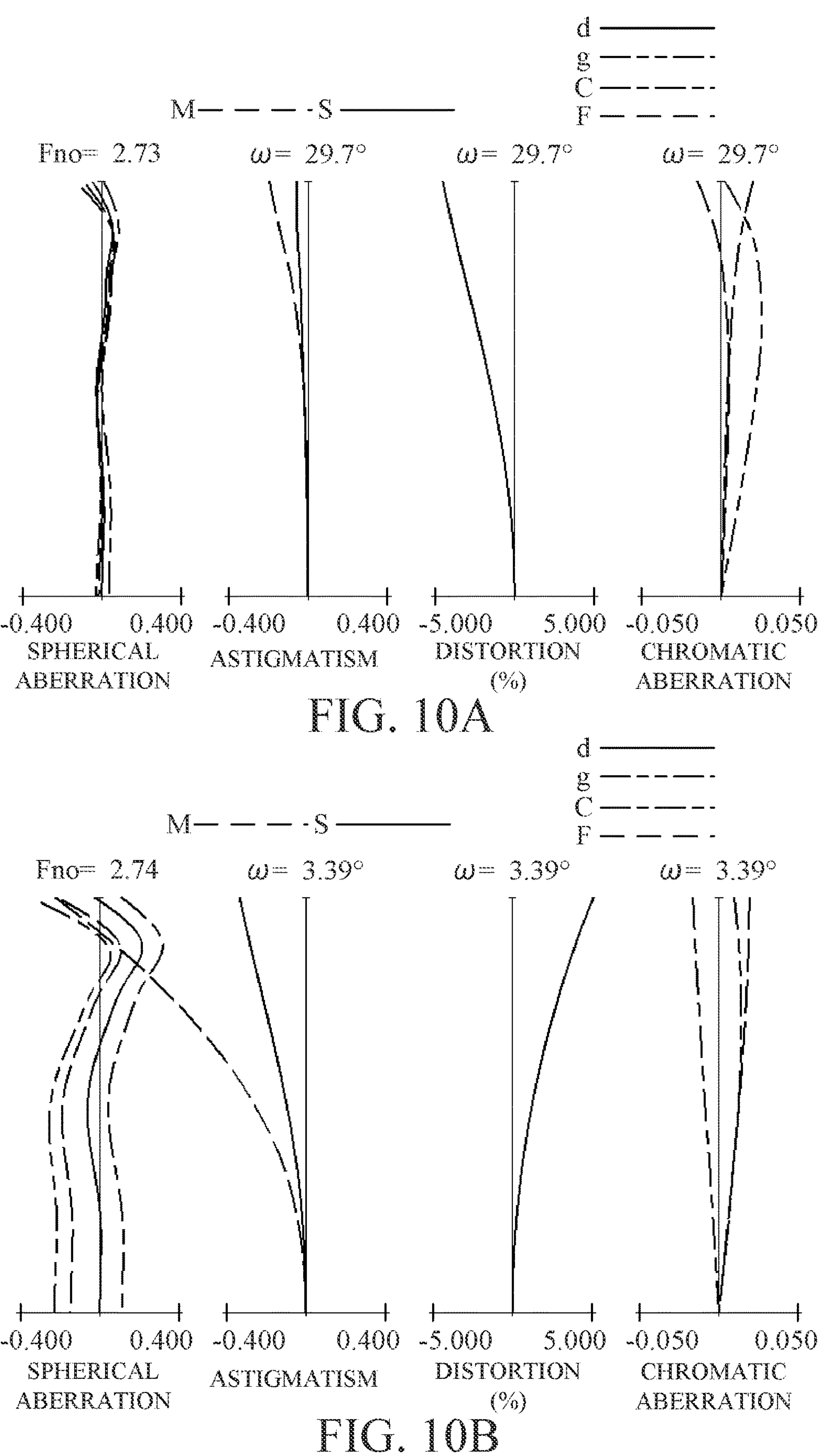
FIGS. 10A and 10B are aberration diagrams of a zoom lens according to Example 5 in the in-focus state at infinity at the wide-angle end and a telephoto end.

FIG. 10A illustrates longitudinal aberrations of the zoom lens according to numerical example 5 in the in-focus state at infinity at the wide-angle end. FIG. 10B illustrates longitudinal aberrations of the zoom lens according to numerical example 5 in the in-focus state at infinity at the telephoto end.

Example 6

Figure 11:
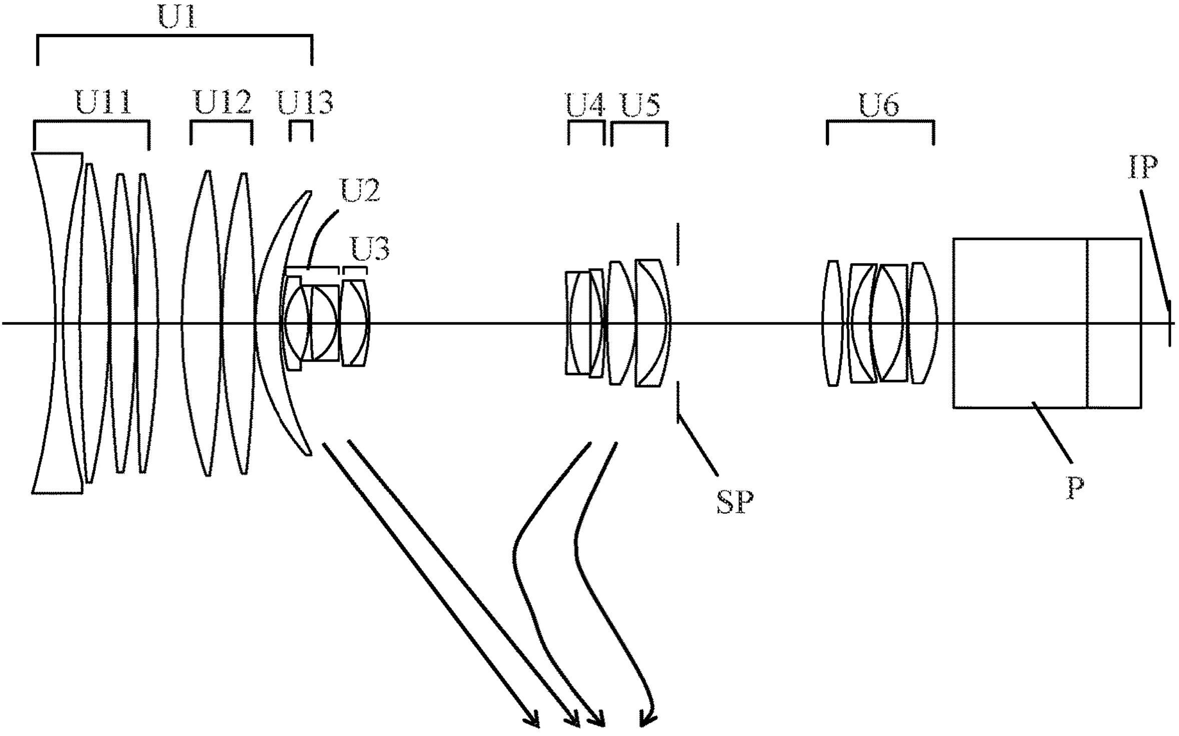
FIG. 11 is a sectional view of a zoom lens according to Example 6 in an in-focus state at infinity at a wide-angle end.

The zoom lens according to Example 6 illustrated in FIG. 11 includes, in order from the object side to the image side, a first lens unit U1 having positive refractive power, a second lens unit U2 having negative refractive power, a third lens unit U3 having positive refractive power, a fourth lens unit U4 having negative refractive power, a fifth lens unit U5 having positive refractive power, an aperture stop SP, and a sixth (final) lens unit U6 having positive refractive power.

The first lens unit U1 is fixed for zooming. The first lens unit U1 consists of a total of seven lenses, one negative lens and six positive lenses, which are successively arranged in this order from the object side to the image side. The first lens unit U1 includes, in order from the object side to the image side, a first subunit U11 having negative refractive power, a second subunit U12 having positive refractive power, and a third subunit U13 having positive refractive power. The second subunit U12 moves toward the object side for focusing from infinity to a close distance. The third subunit U13 moves toward the object side for focusing from infinity to a close distance, independently of the second subunit U12.

The second lens unit U2 is a variator that moves toward the image side during zooming from the wide-angle end to the telephoto end. The third lens unit U3 moves toward the image side during zooming from the wide-angle end to the telephoto end. During zooming from the wide-angle end to the telephoto end, the fourth lens unit U4 first moves toward the object side and then moves toward the image side. During zooming from the wide-angle end to the telephoto end, the fifth lens unit U5 first moves to the object side, then moves to the image side, and then moves to the object side. The sixth lens unit U6 is fixed for zooming. An extender lens or the like may be installed in the sixth lens unit U6.

Numerical example 6 corresponding to this example will be illustrated after this example. Table 1 summarizes values of inequalities (1) to (8) in Numerical Example 6. Numerical example 6 satisfies inequalities (1) to (8). Thereby, the zoom lens according to Example 6 (numerical example 6) has a small size, a wide angle of view, a high zoom ratio, and high optical performance over the entire zoom range.

Figures 12A, 12B:
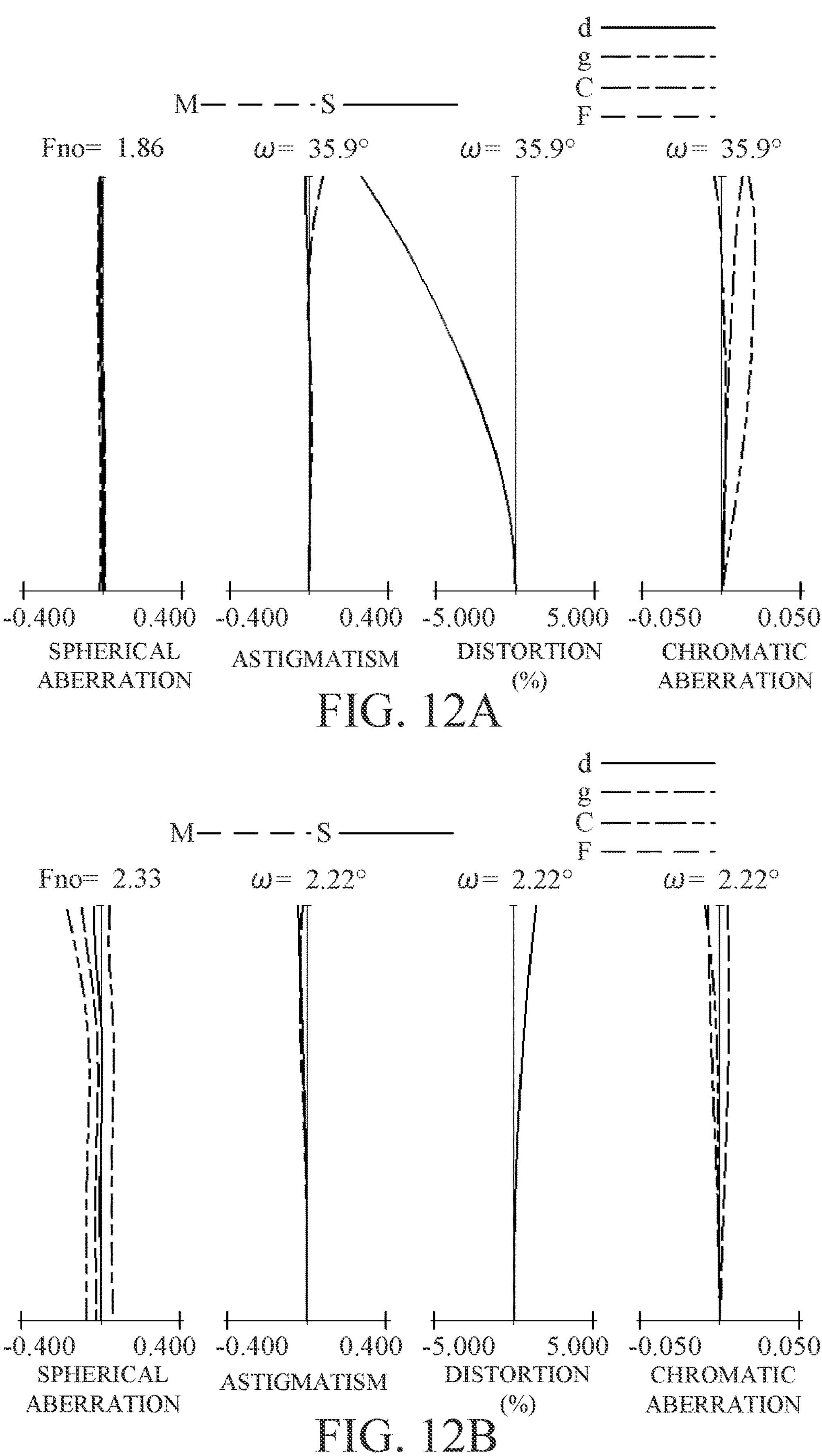
FIGS. 12A and 12B are aberration diagrams of the zoom lens according to Example 6 in the in-focus state at infinity at the wide-angle end and a telephoto end.

FIG. 12A illustrates longitudinal aberrations of the zoom lens according to numerical example 6 in the in-focus state at infinity at the wide-angle end. FIG. 12B illustrates longitudinal aberrations of the zoom lens according to numerical example 6 in the in-focus state at infinity at the telephoto end.

Numerical Example 1

| UNIT: mm | | | | |
|---|---|---|---|---|
| SURFACE DATA | | | | |
| Surface No. | r | d | nd | νd |
| 1 | −175.193 | 1.76 | 1.89190 | 37.1 |
| 2 | 140.918 | 2.73 | | |
| 3 | 192.043 | 9.94 | 1.43387 | 95.1 |
| 4 | −153.079 | 0.20 | | |
| 5 | 235.262 | 7.77 | 1.43387 | 95.1 |
| 6 | −192.675 | 6.79 | | |
| 7 | 132.940 | 7.31 | 1.43387 | 95.1 |
| 8 | −860.016 | 0.20 | | |
| 9 | 127.512 | 9.88 | 1.43387 | 95.1 |
| 10 | −242.544 | 0.17 | | |
| 11 | 57.253 | 5.88 | 1.76385 | 48.5 |
| 12 | 88.704 | (Variable) | | |
| 13* | 104.775 | 0.80 | 2.05090 | 26.9 |
| 14 | 13.483 | 4.98 | | |
| 15 | −30.419 | 0.60 | 1.88300 | 40.8 |
| 16 | 96.765 | 6.65 | 1.89286 | 20.4 |
| 17 | −9.890 | 0.60 | 2.00100 | 29.1 |
| 18 | −607.899 | 0.38 | | |
| 19 | 47.716 | 6.09 | 1.74077 | 27.8 |
| 20 | −15.521 | 0.60 | 2.00100 | 29.1 |
| 21 | −54.137 | (Variable) | | |
| 22 | −144.355 | 0.75 | 1.72916 | 54.7 |
| 23 | 49.238 | 3.28 | 1.84666 | 23.8 |
| 24 | −283.200 | 2.33 | | |
| 25 | −32.380 | 0.75 | 1.88300 | 40.8 |
| 26 | −131.304 | (Variable) | | |
| 27* | 137.801 | 5.91 | 1.72916 | 54.7 |
| 28 | −32.006 | 0.15 | | |
| 29 | 170.670 | 6.84 | 1.49700 | 81.5 |
| 30 | −25.422 | 1.00 | 1.76634 | 35.8 |
| 31 | −83.317 | (Variable) | | |
| 32 (SP) | ∞ | 35.42 | | |
| 33 | 69.395 | 5.76 | 1.76182 | 26.5 |
| 34 | −80.413 | 1.46 | | |
| 35 | 337.521 | 1.00 | 1.95375 | 32.3 |
| 36 | 23.319 | 5.42 | 1.54814 | 45.8 |
| 37 | 352.852 | 0.20 | | |
| 38 | 50.942 | 7.15 | 1.54814 | 45.8 |
| 39 | −23.450 | 1.00 | 2.00100 | 29.1 |
| 40 | 617.972 | 0.47 | | |
| 41 | 90.627 | 6.09 | 1.64000 | 60.1 |
| 42 | −33.983 | 4.00 | | |
| 43 | ∞ | 33.00 | 1.60859 | 46.4 |
| 44 | ∞ | 13.20 | 1.51633 | 64.1 |
| 45 | ∞ | 7.11 | | |
| Image Plane | ∞ | | | |

ASPHERIC DATA

13th Surface

K = 1.92060e+01 A 4 = 1.59814e−05 A 6 = −6.03697e−08
A 8 = 1.79800e−09 A10 = −2.22750e−11 A12 = 9.78754e−14
A14 = 1.54676e−16 A16 = −1.41285e−18

27th Surface

K = 2.00165e+00 A 4 = −3.84301e−06 A 6 = 6.96264e−09
A 8 = −2.29378e−11 A10 = 5.43314e−14 A12 = −3.95827e−17

VARIOUS DATA
ZOOM RATIO 25.01

| | WIDE | MIDDLE | TELE |
|---|---|---|---|
| Focal Length | 7.59 | 29.01 | 189.85 |
| FNO | 1.86 | 1.86 | 2.99 |
| Half Angle of View (°) | 35.92 | 10.74 | 1.66 |
| Image Height | 5.50 | 5.50 | 5.50 |
| Overall Lens Length | 275.76 | 275.76 | 275.76 |
| BF | 7.11 | 7.11 | 7.11 |
| d12 | 0.74 | 35.44 | 55.42 |

-continued

UNIT: mm

| | | | |
|---|---|---|---|
| d21 | 53.78 | 6.47 | 0.76 |
| d26 | 0.68 | 9.56 | 0.76 |
| d31 | 4.96 | 8.69 | 3.22 |

LENS UNIT DATA

| Lens Unit | Starting Surface | Focal Length |
|---|---|---|
| 1 | 1 | 70.03 |
| 2 | 13 | −11.17 |
| 3 | 22 | −49.39 |
| 4 | 27 | 34.22 |
| 5 | 32 | 52.96 |

Numerical Example 2

| UNIT: mm | | | | |
|---|---|---|---|---|
| SURFACE DATA | | | | |
| Surface No. | r | d | nd | νd |
| 1 | −146.951 | 1.76 | 1.95375 | 32.3 |
| 2 | 234.314 | 3.53 | | |
| 3 | 819.700 | 9.20 | 1.43387 | 95.1 |
| 4 | −117.494 | 0.20 | | |
| 5 | 236.999 | 7.52 | 1.43387 | 95.1 |
| 6 | −181.707 | 5.62 | | |
| 7 | 144.784 | 7.89 | 1.43387 | 95.1 |
| 8 | −337.399 | 0.20 | | |
| 9 | 141.741 | 7.62 | 1.43387 | 95.1 |
| 10 | −381.222 | 0.15 | | |
| 11 | 50.506 | 6.72 | 1.76385 | 48.5 |
| 12 | 85.884 | (Variable) | | |
| 13* | 54.357 | 0.80 | 2.05090 | 26.9 |
| 14 | 12.766 | (Variable) | | |
| 15 | −21.871 | 0.60 | 1.88300 | 40.8 |
| 16 | 87.980 | 6.10 | 1.89286 | 20.4 |
| 17 | −10.338 | 0.60 | 2.00100 | 29.1 |
| 18 | 343.399 | 0.14 | | |
| 19 | 49.740 | 6.64 | 1.74077 | 27.8 |
| 20 | −12.717 | 0.60 | 2.00100 | 29.1 |
| 21 | −33.076 | (Variable) | | |
| 22 | −175.401 | 0.75 | 1.72916 | 54.7 |
| 23 | 34.028 | 5.06 | 1.84666 | 23.8 |
| 24 | −972.607 | 2.78 | | |
| 25 | −28.020 | 0.75 | 1.88300 | 40.8 |
| 26 | −130.140 | (Variable) | | |
| 27* | 101.546 | 7.21 | 1.72916 | 54.7 |
| 28 | −30.215 | 0.15 | | |
| 29 | −409.639 | 7.29 | 1.49700 | 81.5 |
| 30 | −19.826 | 1.00 | 1.76634 | 35.8 |
| 31 | −46.232 | (Variable) | | |
| 32 (SP) | ∞ | 35.51 | | |
| 33 | 70.577 | 5.06 | 1.76182 | 26.5 |
| 34 | −83.437 | 1.18 | | |
| 35 | 110.512 | 1.00 | 1.95375 | 32.3 |
| 36 | 21.406 | 4.59 | 1.54814 | 45.8 |
| 37 | 58.480 | 0.20 | | |
| 38 | 39.198 | 7.93 | 1.54814 | 45.8 |
| 39 | −21.667 | 1.00 | 2.00100 | 29.1 |
| 40 | 71119.271 | 0.33 | | |
| 41 | 90.105 | 7.13 | 1.64000 | 60.1 |
| 42 | −32.487 | 4.00 | | |
| 43 | ∞ | 33.00 | 1.60859 | 46.4 |
| 44 | ∞ | 13.20 | 1.51633 | 64.1 |
| 45 | ∞ | 7.13 | | |
| Image Plane | ∞ | | | |

-continued

UNIT: mm

ASPHERIC DATA

13th Surface

K = 8.95400e-01 A 4 = 1.52201e−05 A 6 = −4.60562e−08
A 8 = 1.45116e−09 A10 = −1.39011e−11 A12 = 4.49529e−15
A14 = 6.84225e−16 A16 = −2.54570e−18

27th Surface

K = 2.88907e−01 A 4 = −4.77070e−06 A 6 = 1.22510e−08
A 8 = −2.42260e−11 A10 = 8.27210e−14 A12 = −9.28306e−17

VARIOUS DATA
ZOOM RATIO 18.98

| | WIDE | MIDDLE | TELE |
|---|---|---|---|
| Focal Length | 7.59 | 28.04 | 144.12 |
| FNO | 1.86 | 1.86 | 2.32 |
| Half Angle of View (°) | 35.92 | 11.10 | 2.19 |
| Image Height | 5.50 | 5.50 | 5.50 |
| Overall Lens Length | 269.56 | 269.56 | 269.56 |
| BF | 7.13 | 7.13 | 7.13 |
| d12 | 0.68 | 30.34 | 47.42 |
| d14 | 5.69 | 6.36 | 6.75 |
| d21 | 48.75 | 4.67 | 0.92 |
| d26 | 0.48 | 6.96 | 1.01 |
| d31 | 1.84 | 9.12 | 1.34 |

LENS UNIT DATA

| Lens Unit | Starting Surface | Focal Length |
|---|---|---|
| 1 | 1 | 62.89 |
| 2 | 13 | −16.03 |
| 3 | 15 | −40.37 |
| 4 | 22 | −40.74 |
| 5 | 27 | 31.54 |
| 6 | 32 | 52.64 |

Numerical Example 3

UNIT: mm

SURFACE DATA

| Surface No. | r | d | nd | νd |
|---|---|---|---|---|
| 1 | −164.123 | 1.76 | 1.90525 | 35.0 |
| 2 | 173.122 | 2.53 | | |
| 3 | 242.148 | 9.94 | 1.43387 | 95.1 |
| 4 | −131.927 | 0.20 | | |
| 5 | 258.759 | 7.31 | 1.43387 | 95.1 |
| 6 | −203.501 | 6.74 | | |
| 7 | 142.828 | 6.11 | 1.43387 | 95.1 |
| 8 | −24537.834 | 0.20 | | |
| 9 | 137.130 | 8.65 | 1.43387 | 95.1 |
| 10 | −256.930 | 0.17 | | |
| 11 | 58.746 | 6.50 | 1.76385 | 48.5 |
| 12 | 103.701 | (Variable) | | |
| 13* | 88.718 | 0.80 | 2.05090 | 26.9 |
| 14 | 13.431 | 5.05 | | |
| 15 | −29.140 | 0.60 | 1.88300 | 40.8 |
| 16 | 78.056 | 6.67 | 1.89286 | 20.4 |
| 17 | −9.963 | 0.60 | 2.00100 | 29.1 |
| 18 | −714.636 | 0.56 | | |
| 19 | 47.832 | 6.44 | 1.74077 | 27.8 |
| 20 | −14.988 | 0.60 | 2.00100 | 29.1 |
| 21 | −54.174 | (Variable) | | |
| 22 | −144.355 | 0.75 | 1.72916 | 54.7 |
| 23 | 49.238 | 3.28 | 1.84666 | 23.8 |
| 24 | −283.200 | 2.33 | | |
| 25 | −32.380 | 0.75 | 1.88300 | 40.8 |

-continued

UNIT: mm

| Surface No. | r | d | nd | νd |
|---|---|---|---|---|
| 26 | −131.304 | (Variable) | | |
| 27* | 137.801 | 5.91 | 1.72916 | 54.7 |
| 28 | −32.006 | 0.15 | | |
| 29 | 170.670 | 6.84 | 1.49700 | 81.5 |
| 30 | −25.422 | 1.00 | 1.76634 | 35.8 |
| 31 | −83.317 | (Variable) | | |
| 32 (SP) | ∞ | 35.42 | | |
| 33 | 69.395 | 5.76 | 1.76182 | 26.5 |
| 34 | −80.413 | 1.46 | | |
| 35 | 337.521 | 1.00 | 1.95375 | 32.3 |
| 36 | 23.319 | 5.42 | 1.54814 | 45.8 |
| 37 | 352.852 | 0.20 | | |
| 38 | 50.942 | 7.15 | 1.54814 | 45.8 |
| 39 | −23.450 | 1.00 | 2.00100 | 29.1 |
| 40 | 617.972 | 0.47 | | |
| 41 | 90.627 | 6.09 | 1.64000 | 60.1 |
| 42 | −33.981 | 4.00 | | |
| 43 | ∞ | 33.00 | 1.60859 | 46.4 |
| 44 | ∞ | 13.20 | 1.51633 | 64.1 |
| 45 | ∞ | 7.10 | | |
| Image Plane | ∞ | | | |

ASPHERIC DATA

13th Surface

K = 7.48845e−01 A 4 = 1.70010e−05 A 6 = −4.39791e−08
A 8 = 1.51517e−09 A10 = −1.71810e−11 A12 = 4.36262e−14
A14 = 4.63343e−16 A16 = −2.12503e−18

27th Surface

K = 2.00165e+00 A 4 = −3.84301e−06 A 6 = 6.96264e−09
A 8 = −2.29378e−11 A10 = 5.43314e−14 A12 = −3.95827e−17

VARIOUS DATA
ZOOM RATIO 26.15

| | WIDE | MIDDLE | TELE |
|---|---|---|---|
| Focal Length | 7.50 | 28.78 | 196.09 |
| FNO | 1.86 | 1.86 | 3.10 |
| Half Angle of View (°) | 36.25 | 10.82 | 1.61 |
| Image Height | 5.50 | 5.50 | 5.50 |
| Overall Lens Length | 273.87 | 273.87 | 273.87 |
| BF | 7.10 | 7.10 | 7.10 |
| d12 | 0.74 | 35.44 | 55.42 |
| d21 | 53.78 | 6.47 | 0.76 |
| d26 | 0.68 | 9.57 | 0.51 |
| d31 | 4.96 | 8.68 | 3.47 |

LENS UNIT DATA

| Lens Unit | Starting Surface | Focal Length |
|---|---|---|
| 1 | 1 | 70.03 |
| 2 | 13 | −11.01 |
| 3 | 22 | −49.39 |
| 4 | 27 | 34.22 |
| 5 | 32 | 52.95 |

Numerical Example 4

UNIT: mm

SURFACE DATA

| Surface No. | r | d | nd | νd |
|---|---|---|---|---|
| 1 | −136.082 | 1.76 | 1.91650 | 31.6 |
| 2 | 245.057 | 5.35 | | |
| 3 | −699.405 | 6.26 | 1.43387 | 95.1 |
| 4 | −124.825 | 0.19 | | |
| 5 | 194.401 | 9.67 | 1.43387 | 95.1 |

-continued

| UNIT: mm | | | | |
|---|---|---|---|---|
| 6 | −133.404 | 5.89 | | |
| 7 | 341.111 | 6.81 | 1.43387 | 95.1 |
| 8 | −190.601 | 0.20 | | |
| 9 | 137.775 | 6.90 | 1.43387 | 95.1 |
| 10 | −850.655 | 1.57 | | |
| 11 | 53.335 | 7.51 | 1.75500 | 52.3 |
| 12 | 101.301 | (Variable) | | |
| 13* | 46.658 | 0.80 | 2.05090 | 26.9 |
| 14 | 13.675 | 5.30 | | |
| 15 | −26.742 | 0.60 | 1.88300 | 40.8 |
| 16 | 27.232 | 6.63 | 1.89286 | 20.4 |
| 17 | −11.557 | 0.60 | 2.00100 | 29.1 |
| 18 | 198.498 | (Variable) | | |
| 19 | 43.548 | 7.30 | 1.74077 | 27.8 |
| 20 | −13.708 | 0.60 | 2.00100 | 29.1 |
| 21 | −60.040 | (Variable) | | |
| 22 | −145.489 | 0.75 | 1.72916 | 54.7 |
| 23 | 53.204 | 3.25 | 1.84666 | 23.8 |
| 24 | −236.654 | 2.21 | | |
| 25 | −33.605 | 0.75 | 1.88300 | 40.8 |
| 26 | −140.630 | (Variable) | | |
| 27* | 116.494 | 5.86 | 1.72916 | 54.7 |
| 28 | −33.877 | 0.15 | | |
| 29 | 124.143 | 6.86 | 1.49700 | 81.5 |
| 30 | −26.764 | 1.00 | 1.76634 | 35.8 |
| 31 | −105.794 | (Variable) | | |
| 32 (SP) | ∞ | 36.04 | | |
| 33 | 104.671 | 4.85 | 1.76182 | 26.5 |
| 34 | −81.507 | 2.59 | | |
| 35 | 113.876 | 1.00 | 1.95375 | 32.3 |
| 36 | 21.877 | 5.03 | 1.54814 | 45.8 |
| 37 | 90.055 | 0.20 | | |
| 38 | 40.949 | 7.16 | 1.54814 | 45.8 |
| 39 | −26.416 | 1.00 | 2.00100 | 29.1 |
| 40 | 625.002 | 0.18 | | |
| 41 | 68.931 | 5.95 | 1.64000 | 60.1 |
| 42 | −39.569 | 4.00 | | |
| 43 | ∞ | 33.00 | 1.60859 | 46.4 |
| 44 | ∞ | 13.20 | 1.51633 | 64.1 |
| 45 | ∞ | 7.20 | | |
| Image Plane | ∞ | | | |

ASPHERIC DATA

13th Surface

K = 8.02367e−01 A 4 = 7.64682e−06 A 6 = 5.28518e−08
A 8 = −1.65170e−09 A10 = 4.16756e−11 A12 = −5.01799e−13
A14 = 2.92758e−15 A16 = −6.50738e−18

27th Surface

K = −2.01428e+00 A 4 = −3.46851e−06 A 6 = 4.54888e−09
A 8 = −2.81802e−12 A10 = −2.27269e−14 A12 = 6.88227e−17

VARIOUS DATA
ZOOM RATIO 20.98

| | WIDE | MIDDLE | TELE |
|---|---|---|---|
| Focal Length | 7.67 | 28.41 | 160.92 |
| FNO | 1.86 | 1.86 | 2.61 |
| Half Angle of View (°) | 35.64 | 10.96 | 1.96 |
| Image Height | 5.50 | 5.50 | 5.50 |
| Overall Lens Length | 273.33 | 273.33 | 273.33 |
| BF | 7.20 | 7.20 | 7.20 |
| d12 | 0.68 | 32.10 | 50.20 |
| d18 | 2.18 | 1.06 | 1.46 |
| d21 | 52.90 | 5.96 | 0.39 |
| d26 | 0.43 | 10.29 | 2.42 |
| d31 | 0.98 | 7.76 | 2.70 |

LENS UNIT DATA

| Lens Unit | Starting Surface | Focal Length |
|---|---|---|
| 1 | 1 | 65.26 |
| 2 | 13 | −8.40 |
| 3 | 19 | 67.26 |
| 4 | 22 | −51.99 |
| 5 | 27 | 34.74 |
| 6 | 32 | 52.58 |

Numerical Example 5

UNIT: mm

SURFACE DATA

| Surface No. | r | d | nd | νd |
|---|---|---|---|---|
| 1 | −302.515 | 2.10 | 1.83400 | 37.2 |
| 2 | 170.205 | 1.90 | | |
| 3 | 165.689 | 14.15 | 1.43387 | 95.1 |
| 4 | −230.652 | 0.15 | | |
| 5 | 655.102 | 10.73 | 1.43387 | 95.1 |
| 6 | −179.298 | 15.87 | | |
| 7 | 167.025 | 8.49 | 1.43387 | 95.1 |
| 8 | 6122.572 | 0.03 | | |
| 9 | 101.382 | 9.52 | 1.43387 | 95.1 |
| 10 | 276.819 | 0.64 | | |
| 11 | 112.153 | 7.39 | 1.78590 | 44.2 |
| 12 | 260.499 | (Variable) | | |
| 13 | −238.095 | 1.30 | 2.00100 | 29.1 |
| 14 | 25.830 | 5.43 | | |
| 15 | −41.819 | 1.10 | 1.72916 | 54.7 |
| 16 | 92.774 | 0.68 | | |
| 17 | 73.798 | 6.04 | 1.85478 | 24.8 |
| 18 | −26.977 | 0.25 | | |
| 19 | −25.726 | 1.10 | 1.72916 | 54.7 |
| 20* | −247.808 | (Variable) | | |
| 21 | −53.716 | 1.30 | 1.65160 | 58.5 |
| 22 | 530.043 | 2.14 | 1.95906 | 17.5 |
| 23 | −621.202 | (Variable) | | |
| 24* | 82.677 | 5.36 | 1.72916 | 54.7 |
| 25 | −71.160 | (Variable) | | |
| 26 (SP) | ∞ | 2.00 | | |
| 27 | 81.190 | 2.00 | 1.88300 | 40.8 |
| 28 | 30.426 | 7.28 | 1.59522 | 67.7 |
| 29 | −133.602 | 32.99 | | |
| 30 | −296.593 | 5.63 | 1.64769 | 33.8 |
| 31 | −38.551 | 0.18 | | |
| 32 | 240.807 | 7.38 | 1.48749 | 70.2 |
| 33 | −29.646 | 1.10 | 2.00069 | 25.5 |
| 34 | 505.990 | 1.99 | | |
| 35 | 84.780 | 6.78 | 1.53172 | 48.8 |
| 36 | −55.121 | 0.20 | | |
| 37 | 65.567 | 6.75 | 1.49700 | 81.5 |
| 38 | −38.335 | 1.00 | 1.88300 | 40.8 |
| 39 | 41.309 | 3.19 | | |
| 40 | 98.378 | 10.94 | 1.62004 | 36.3 |
| 41 | −20.298 | 1.00 | 1.48749 | 70.2 |
| 42 | 429.020 | 1.82 | | |
| 43 | 6173.485 | 2.42 | 1.85478 | 24.8 |
| 44 | −266.134 | 41.13 | | |
| Image Plane | ∞ | | | |

ASPHERIC DATA

20th Surface

K = 1.28555e+02 A 4 = −2.56791e−06 A 6 = −2.81115e−09
A 8 = 4.62715e−11 A10 = −5.07051e−13 A12 = 3.18501e−15
A14 = −1.03755e−17 A16 = 1.33737e−20

24th Surface

K = −4.07689e+00 A 4 = −1.66803e−06 A 6− 5.72601e−09
A 8 = −6.90648e−11 A10 = 4.74775e−13 A12 = −1.76125e−15
A14 = 3.33248e−18 A16 = −2.51981e−21

-continued

| UNIT: mm | | | |
|---|---|---|---|
| VARIOUS DATA<br>ZOOM RATIO 9.61 | | | |
| | WIDE | MIDDLE | TELE |
| Focal Length | 26.00 | 59.26 | 249.94 |
| FNO | 2.73 | 2.74 | 2.74 |
| Half Angle of View (°) | 29.65 | 14.02 | 3.39 |
| Image Height | 14.80 | 14.80 | 14.80 |
| Overall Lens Length | 302.75 | 302.75 | 302.75 |
| BF | 41.13 | 41.13 | 41.13 |
| d12 | 1.68 | 33.45 | 65.22 |
| d20 | 51.49 | 8.18 | 2.40 |
| d23 | 0.99 | 14.77 | 1.13 |
| d25 | 17.15 | 14.91 | 2.57 |

LENS UNIT DATA

| Lens Unit | Starting Surface | Focal Length |
|---|---|---|
| 1 | 1 | 98.07 |
| 2 | 13 | −20.13 |
| 3 | 21 | −100.33 |
| 4 | 24 | 53.23 |
| 5 | 26 | 89.48 |

Numerical Example 6

UNIT: mm

SURFACE DATA

| Surface No. | r | d | nd | νd |
|---|---|---|---|---|
| 1 | −156.772 | 1.76 | 1.95142 | 35.0 |
| 2 | 163.360 | 4.16 | | |
| 3 | 444.747 | 7.24 | 1.43387 | 95.1 |
| 4 | −177.685 | 0.20 | | |
| 5 | 365.994 | 6.35 | 1.43387 | 95.1 |
| 6 | −218.485 | 0.20 | | |
| 7 | 724.443 | 5.27 | 1.43387 | 95.1 |
| 8 | −206.309 | 5.87 | | |
| 9 | 120.405 | 9.67 | 1.43387 | 95.1 |
| 10 | −248.810 | 0.20 | | |
| 11 | 142.232 | 8.09 | 1.43387 | 95.1 |
| 12 | −326.983 | 0.12 | | |
| 13 | 47.900 | 6.08 | 1.76385 | 48.5 |
| 14 | 69.099 | (Variable) | | |
| 15* | 57.980 | 0.80 | 2.05090 | 26.9 |
| 16 | 12.800 | (Variable) | | |
| 17 | −24.245 | 0.60 | 1.88300 | 40.8 |
| 18 | 92.055 | 6.27 | 1.89286 | 20.4 |
| 19 | −10.207 | 0.60 | 2.00100 | 29.1 |
| 20 | −777.391 | 0.18 | | |
| 21 | 53.242 | 6.69 | 1.74077 | 27.8 |
| 22 | −14.429 | 0.60 | 2.00100 | 29.1 |
| 23 | −41.178 | (Variable) | | |
| 24 | −175.401 | 0.75 | 1.72916 | 54.7 |
| 25 | 34.028 | 5.06 | 1.84666 | 23.8 |
| 26 | −972.607 | 2.78 | | |
| 27 | −28.020 | 0.75 | 1.88300 | 40.8 |
| 28 | −130.140 | (Variable) | | |
| 29* | 101.546 | 7.21 | 1.72916 | 54.7 |
| 30 | −30.215 | 0.15 | | |
| 31 | −409.639 | 7.29 | 1.49700 | 81.5 |
| 32 | −19.826 | 1.00 | 1.76634 | 35.8 |
| 33 | −46.232 | (Variable) | | |
| 34 (SP) | ∞ | 35.51 | | |
| 35 | 70.577 | 5.06 | 1.76182 | 26.5 |
| 36 | −83.437 | 1.18 | | |
| 37 | 110.512 | 1.00 | 1.95375 | 32.3 |
| 38 | 21.406 | 4.59 | 1.54814 | 45.8 |
| 39 | 58.480 | 0.20 | | |
| 40 | 39.198 | 7.93 | 1.54814 | 45.8 |
| 41 | −21.667 | 1.00 | 2.00100 | 29.1 |
| 42 | 71119.271 | 0.33 | | |
| 43 | 90.105 | 7.13 | 1.64000 | 60.1 |
| 44 | −32.485 | 4.00 | | |
| 45 | ∞ | 33.00 | 1.60859 | 46.4 |
| 46 | ∞ | 13.20 | 1.51633 | 64.1 |
| 47 | ∞ | 7.13 | | |
| Image Plane | ∞ | | | |

ASPHERIC DATA

15th Surface

K = 5.77186e+00 A 4 = 1.18045e−05 A 6 = −6.71623e−08
A 8 = 2.13999e−09 A10 = −3.16064e−11 A12 = 2.17359e−13
A14 = −5.78315e−16 A16 = 2.69802e−19

29th Surface

K = 2.88907e−01 A 4 = −4.77070e−06 A 6 = 1.22510e−08
A 8 = −2.42260e−11 A10 = 8.27210e−14 A12 = −9.28306e−17

| VARIOUS DATA<br>ZOOM RATIO 18.72 | | | |
|---|---|---|---|
| | WIDE | MIDDLE | TELE |
| Focal Length | 7.59 | 28.00 | 142.12 |
| FNO | 1.86 | 1.86 | 2.33 |
| Half Angle of View (°) | 35.92 | 11.11 | 2.22 |
| Image Height | 5.50 | 5.50 | 5.50 |
| Overall Lens Length | 274.64 | 274.64 | 274.64 |
| BF | 7.13 | 7.13 | 7.13 |
| d14 | 0.68 | 30.34 | 47.42 |
| d16 | 5.69 | 6.36 | 6.75 |
| d23 | 48.75 | 4.67 | 0.92 |
| d28 | 0.48 | 6.93 | 0.91 |
| d33 | 1.84 | 9.15 | 1.44 |

LENS UNIT DATA

| Lens Unit | Starting Surface | Focal Length |
|---|---|---|
| 1 | 1 | 62.12 |
| 2 | 15 | −15.77 |
| 3 | 17 | −44.68 |
| 4 | 24 | −40.74 |
| 5 | 29 | 31.54 |
| 6 | 34 | 52.63 |

TABLE 1

| INEQUALITY | Ex. 1 | Ex. 2 | Ex. 3 | Ex. 4 | Ex. 5 | Ex. 6 |
|---|---|---|---|---|---|---|
| (1) 2.96 ≤ Ndn + 0.0333 × νdn ≤ 3.20 | 3.13 | 3.03 | 3.07 | 2.97 | 3.07 | 3.12 |
| (2) 1.82 ≤ Ndn ≤ 2.07 | 1.89 | 1.95 | 1.91 | 1.92 | 1.83 | 1.95 |
| (3) 2.0 ≤ \|f1n/fw\| ≤ 18.0 | 11.5 | 12.4 | 12.4 | 12.4 | 5.0 | 11.0 |
| (4) −0.30 ≤ (R2 + R1)/(R2 − R1) ≤ 0.30 | −0.11 | 0.23 | 0.03 | 0.29 | −0.28 | 0.02 |
| (5) 4.4 ≤ Dn ≤ 6.0 | 4.9 | 4.9 | 4.8 | 4.7 | 4.4 | 5.0 |
| (6) 80.0 ≤ νdpave ≤ 96.0 | 85.8 | 85.8 | 85.8 | 86.5 | 84.9 | 87.3 |
| (7) 2.8 ≤ \|f1/fnmx\| ≤ 13.0 | 6.3 | 3.9 | 6.4 | 7.8 | 4.9 | 3.9 |
| (8) 0.5 ≤ \|f1n/f1\| ≤ 5.0 | 1.2 | 1.5 | 1.3 | 1.5 | 1.3 | 1.4 |
| Ndn | 1.892 | 1.954 | 1.905 | 1.917 | 1.834 | 1.951 |
| νdn | 37.13 | 32.32 | 35.04 | 31.60 | 37.16 | 35.04 |
| f1n | −87.33 | −94.48 | −92.84 | −95.26 | −130.34 | −83.86 |
| fw | 7.59 | 7.59 | 7.50 | 7.67 | 26.00 | 7.59 |
| R1 | −175.19 | −146.95 | −164.12 | −136.08 | −302.51 | −156.77 |
| R2 | 140.92 | 234.31 | 173.12 | 245.06 | 170.20 | 163.36 |
| Dn | 4.87 | 4.94 | 4.83 | 4.74 | 4.43 | 5.02 |
| νdpave | 85.78 | 85.78 | 85.78 | 86.54 | 84.92 | 87.33 |
| f1 | 70.03 | 62.89 | 70.03 | 65.26 | 98.07 | 62.12 |
| fnmx | −11.17 | −16.03 | −11.01 | −8.40 | −20.13 | −15.77 |

Image Pickup Apparatus

Figure 13:
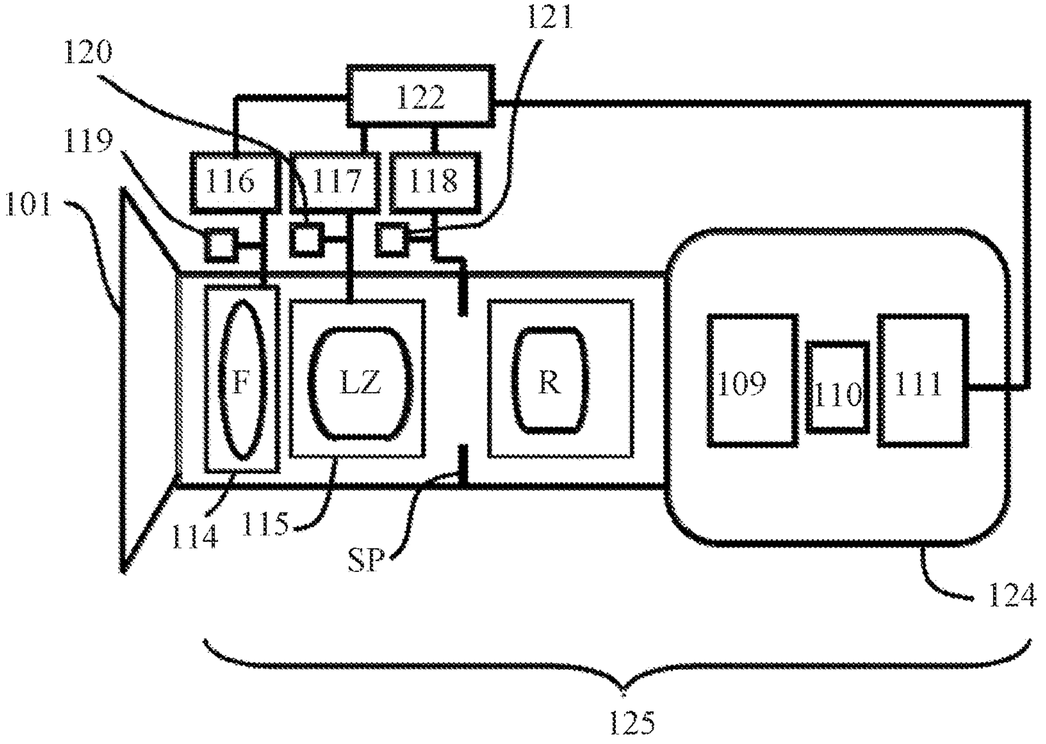
FIG. 13 illustrates an image pickup apparatus having the zoom lens according to any one of Examples 1 to 6.

FIG. 13 illustrates an image pickup apparatus (broadcasting camera) using the zoom lens 101 according to any one of Examples 1 to 6 as an imaging optical system. Reference numeral 124 denotes a camera body. The zoom lens 101 is attachable to and detachable from the camera body 124. Reference numeral 125 denotes an image pickup apparatus configured by mounting the zoom lens 101 on the camera body 124. The zoom lens 101 includes a first lens unit F, a zoom unit LZ, and a rear group R for imaging. The first lens unit F includes a lens unit (subunit) that moves during focusing. The zoom unit LZ includes at least one lens unit that moves during zooming. SP represents an aperture stop.

Reference numerals 114 and 115 are driving mechanisms such as helicoids and cams configured to drive the first lens unit F and the zoom unit LZ in the optical axis direction, respectively. Reference numerals 116 to 118 are motors configured to drive the driving mechanisms 114 and 115 and the aperture stop SP. Reference numerals 119 to 121 denote detectors such as encoders, potentiometers, or photosensors for detecting the positions of the first lens unit F and the zoom unit LZ on the optical axis and the aperture diameter in the aperture stop SP.

In the camera body 124, reference numeral 109 denotes a glass block corresponding to an optical filter or a color separation optical system within the camera body 124. Reference numeral 110 denotes an image sensor such as a CCD sensor or a CMOS sensor configured to image an object through the zoom lens 101. Reference numerals 111 and 122 denote control units such as a CPU configured to control various drives of the camera body 124 and the zoom lens 101, respectively.

Using the zoom lenses according to each example as an imaging optical system, an image pickup apparatus has high optical performance.

While the disclosure has described example embodiments, it is to be understood that some embodiments are not limited to the disclosed embodiments. The scope of the following claims is to be accorded the broadest interpretation so as to encompass all such modifications and equivalent structures and functions.

This disclosure can provide a zoom lens having a configuration that is beneficial to a wide angle of view, a small size, a high zoom ratio, and high optical performance over the entire zoom range.

This application claims priority to Japanese Patent Application No. 2023-040341, which was filed on Mar. 15, 2023, and which is hereby incorporated by reference herein in its entirety.

What is claimed is:

1. A zoom lens comprising, as a plurality of lens units arranged in order from an object side to an image side:

a first lens unit having positive refractive power and fixed for zooming;

at least two movable lens units having negative refractive powers and configured to move for zooming; and a final lens unit having positive refractive power, fixed for zooming, and disposed closest to an image plane, wherein each distance between adjacent lens units changes during zooming, wherein at least a part of the first lens unit moves for focusing, wherein the first lens unit includes a negative lens A and at least five positive lenses, which are successively arranged in this order from the object side to the image side, wherein, among the at least two movable lens units, a lens unit having negative refractive power and disposed closest to the image side includes at least two negative lenses, and wherein the following inequalities are satisfied:

$$2.96 \leq Ndn + 0.0333 \times \nu dn \leq 3.20$$

$$1.82 \leq Ndn \leq 2.07$$

$$2.0 \leq |f1n/fw| \leq 18.0$$

where Ndn is a refractive index of the negative lens A for d-line, νdn is an Abbe number of the negative lens A based on the d-line, f1n is a focal length of the negative lens A, and fw is a focal length of the zoom lens at a wide-angle end.

2. The zoom lens according to claim 1, wherein the following inequality is satisfied:

$$-0.3 \leq (R2+R1)/(R2-R1) \leq 0.3$$

where R1 is a radius of curvature of a lens surface on the object side of the negative lens A, and R2 is a radius of curvature of a lens surface on the image side of the negative lens A.

3. The zoom lens according to claim 1, wherein the following inequality is satisfied:

$$4.4 \leq Dn \leq 6.0$$

where Dn is specific gravity of the negative lens A.

4. The zoom lens according to claim 1, wherein the following inequality is satisfied:

$$80.0 \leq vdpave \leq 96.0$$

vdpave is an average of Abbe numbers of the five positive lenses based on the d-line.

5. The zoom lens according to claim 1, wherein the first lens unit includes, in order from the object side to the image side, a first subunit, a second subunit, and a third subunit, and wherein the second subunit has positive refractive power and moves toward the object side for focusing from infinity to a close distance.

6. The zoom lens according to claim 1, wherein the following inequality is satisfied:

$$2.8 \leq |fl / fnmx| \leq 13.0$$

where f1 is a focal length of the first lens unit, and fnmx is a focal length of a lens unit having a largest absolute value of refractive power among the at least two movable lens units.

7. The zoom lens according to claim 1, wherein the following inequality is satisfied:

$$0.5 \leq |fln / fl| \leq 5.0$$

where f1 is a focal length of the first lens unit.

8. The zoom lens according to claim 1, wherein the first lens unit consists of the negative lens A and the five positive lenses.

9. The zoom lens according to claim 1, wherein the first lens unit consists of six positive lenses including the five positive lenses and the negative lens A.

10. The zoom lens according to claim 1, wherein the plurality of lens units include the first lens unit, a second lens unit having negative refractive power and configured to move for zooming, and a rear group, wherein the rear group includes, successively in order from the image side to the object side:

the final lens unit, and a lens unit having positive refractive power and configured to move for zooming, and at least one lens unit configured to move for zooming.

11. The zoom lens according to claim 10, while the rear group includes, in order from the object side to the image side:

a third lens unit having negative refractive power, a fourth lens unit having positive refractive power, and a fifth lens unit as the final lens unit.

12. The zoom lens accords to claim 10, wherein the rear group includes, in order from the object side to the image side:

a third lens unit having positive or negative refractive power, a fourth lens unit having negative refractive power, a fifth lens unit having positive refractive power, and a sixth lens unit as the final lens unit.

13. An image pickup apparatus comprising:

the zoom lens according to claim 1; and an image sensor configured to image an object through the zoom lens.

* * * * *